United States Patent
Werner

(10) Patent No.: US 6,233,807 B1
(45) Date of Patent: May 22, 2001

(54) PROCESS FOR AUTOMATICALLY SCREW-CONNECTING TWO COMPONENTS

(75) Inventor: Johannes Werner, Hamburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/092,976

(22) Filed: Jun. 8, 1998

Related U.S. Application Data

(63) Continuation of application No. PCT/EP96/04641, filed on Oct. 25, 1996.

(30) Foreign Application Priority Data

Dec. 7, 1995 (DE) ............................................. 195 45 610

(51) Int. Cl.[7] ........................... B23Q 17/00; G01M 19/00
(52) U.S. Cl. ................................... 29/407.02; 29/407.03; 29/525.11; 29/888.06
(58) Field of Search ........................... 29/407.02, 407.05, 29/520, 888.06, 525.11, 407.03; 411/413, 411, 412, 389

(56) References Cited

U.S. PATENT DOCUMENTS

| 3,046,953 | 7/1962 | Dolza . |
| 4,745,892 | 5/1988 | Ruf et al. . |
| 4,784,554 | 11/1988 | Break . |
| 4,887,341 | * 12/1989 | Sakimori et al. ................. 29/525.11 |
| 4,961,035 | 10/1990 | Inaba et al. . |
| 5,248,232 | 9/1993 | Chiang . |

FOREIGN PATENT DOCUMENTS

| 3216773A1 | 11/1983 | (DE) . |
| 4126539A1 | 2/1993 | (DE) . |
| 0203370A1 | 12/1986 | (EP) . |
| 2 317 999 | 2/1977 | (FR) . |
| 55-44029 | 3/1980 | (JP) . |
| 62-101879 | 10/1985 | (JP) . |
| 61-19527 | 1/1986 | (JP) . |
| 3-190680 | 8/1991 | (JP) . |
| 4-219510 | 8/1992 | (JP) . |

OTHER PUBLICATIONS

V.D.I.—Zeitschrift, Bd. 127, Nr. 19, Oct. 1985, Düsseldorf, Germany, pp. 115–119, G. Schuff: "Schraubvorgaenge automatisieren".

Search Report, from International (PCT) Feb. 28, 1997 WOX.

* cited by examiner

Primary Examiner—P. W. Echols
Assistant Examiner—Jermie E. Cozart
(74) Attorney, Agent, or Firm—Evenson, McKeown, Edwards & Lenahan, P.L.L.C.

(57) ABSTRACT

A process is provided for automatically screw-connecting two components using the torque-controlled tightening method, and to a stud and a union nut provided for carrying out the process. Also provided are an automatic fitting machine and a connecting element via which the two components are screw-connected. In order for it to be possible to execute the screw-connection operation quickly and to obtain a secure connection between the two components, the process provides for the connecting element first of all to be pre-tightened with rotary-angle control and then to be tightened definitively with torque control. The connecting element has two same-direction threaded sections of different pitches and each threaded section is screw-connected to one component in each case. The stud for carrying out the process has a screw head for the engagement of a suitable fitting tool, a marking which indicates the angular position of the stud being arranged on the screw head. The union nut for carrying out the process has a first threaded section, designed as an internal thread which extends over not more than approximately half the length of the union nut and is adjoined by a thread-free inner section.

29 Claims, 22 Drawing Sheets

19,20

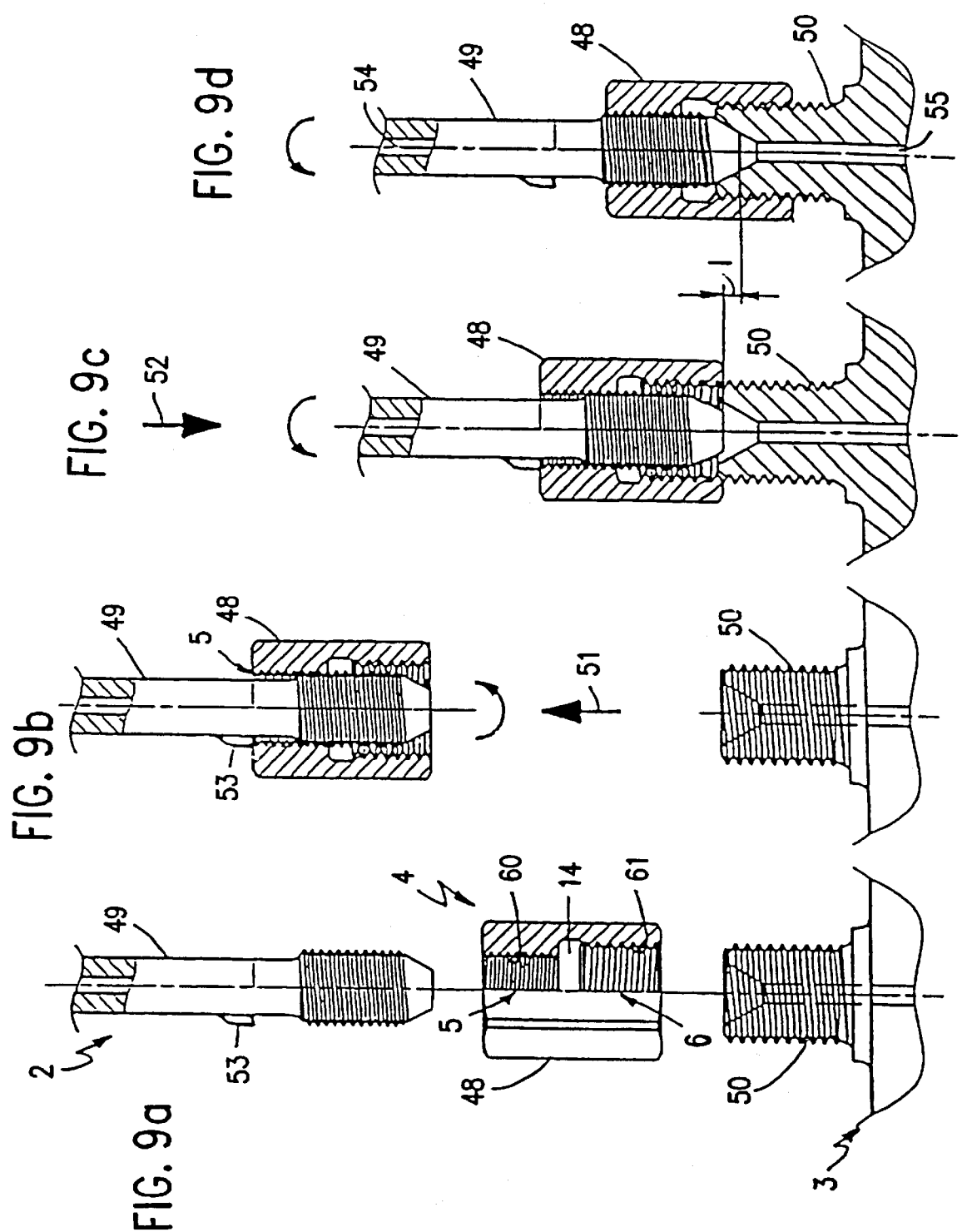

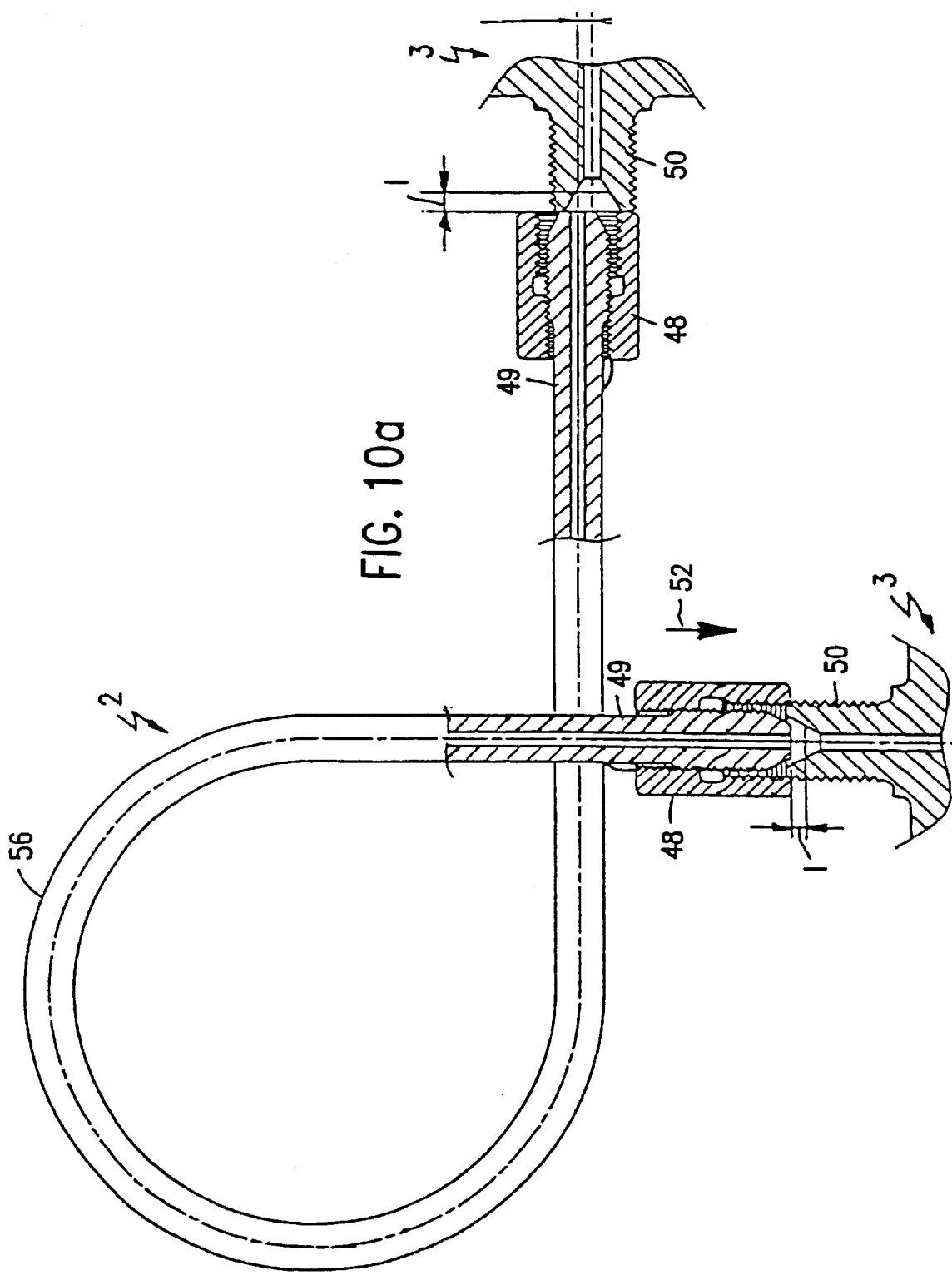

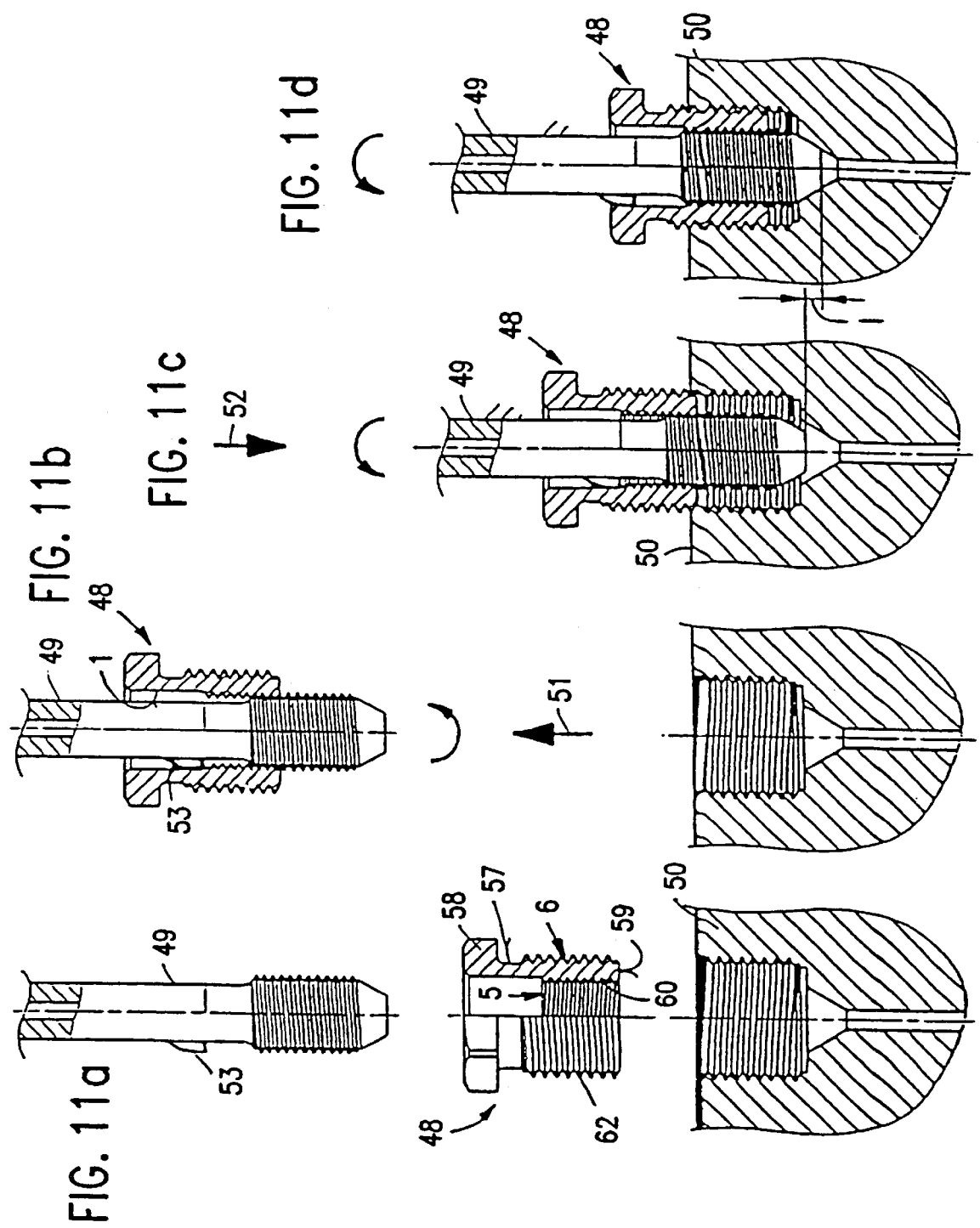

PROCESS FOR AUTOMATICALLY SCREW-CONNECTING TWO COMPONENTS

This is continuation of PCT application PCT/EP/96/04641 filed Oct. 25, 1996, which is based upon German priority application 195 45 610.6 filed in Germany on Dec. 7, 1995, the disclosures of which are expressly incorporated by reference herein.

BACKGROUND AND SUMMARY OF THE INVENTION

The invention relates to a process for automatically screw-connecting two components, and to a stud and a union nut for carrying out the process. Preferred embodiments of the invention relate to such processes and devices with which an automatic fitting machine utilizing a torque controlled tightening method can be used.

"Die Flexibilisierung der Schraubmontage" [Screwed fitting made versatile] by A. Stapel, published in "Technische Rundschau" 39/85, discloses a process for automatic screwed fitting. The process is carried out, with the aid of an automatic fitting machine, in two steps, in that the components which are to be connected first of all are screw-connected until a predetermined preliminary tightening moment has been reached and then are tightened until a final torque value has been reached. The tightening moment has to be monitored permanently throughout the two fitting steps and the tightening operation has to be interrupted when the respectively predetermined limit values have been reached. If the two components are to be connected via a plurality of screws, it is necessary for the tightening moments of each individual screw to be monitored, this rendering the technical outlay for monitoring purposes very high. Irregularities in the surfaces of the components or settling may result in the screws each being located in different angular positions following a fitting step. This makes it difficult for the fitting tool to be attached easily and quickly at the beginning of the new fitting step or for the purpose of releasing the screw-connections. Another disadvantage is that, when conventional screws are used for transmitting high screw forces, it is necessary to apply a large tightening moment, which, in addition to corresponding dimensioning of the automatic fitting machine, also presupposes the use of suitable screws, which are of stable enough design to absorb high torsional and longitudinal forces.

An object of the invention is to specify a process, as well as a stud and a union nut for use in this process, for automatically screw-connecting two components using the torque-controlled tightening method, by means of which it is possible for the screw-connection operation to be executed quickly and a secure connection between the two components is obtained.

This object is achieved according to preferred embodiments of the invention, utilizing a process for automatically screw-connecting first and second components by a torque-controlled tightening method with an automatic fitting machine and a connecting element which screw-connects the components, wherein the connecting element has two same-direction threaded sections of different pitches and each threaded section is screw-connected to one component in each case, with the following process steps for completing the fitting operation: rotary-angle-controlled preliminary tightening of the connecting element, termination of the rotary-angle-controlled preliminary tightening when there is contact between mutually facing surfaces of the components which are to be connected, and then torque-controlled definitive tightening until a predetermined final torque value has been reached.

This object is also achieved according to preferred embodiments by utilizing a stud which has angular markings on the screw head indicating the angular position thereof.

This object is also achieved according to preferred embodiments by utilizing a union nut with a first internal thread extending no more than approximately one-half the length of the nut, which threaded section is adjoined by a non-threaded section.

The rotary-angle-controlled preliminary tightening of the screw during the first fitting step can take place at a considerably higher angular velocity than the hitherto conventional torque-controlled preliminary tightening since permanent torque monitoring is dispensed with. In the case of rotary-angle-controlled preliminary tightening, the screw is rotated by a certain angle, which can be set in the automatic fitting machine; in contrast to the torque-controlled process, it is not necessary to monitor the connection throughout the entire tightening operation, with the result that the first fitting step can be carried out swiftly and with low outlay, without torque monitoring.

During preliminary tightening, the two components which are to be connected advance towards one another, the mutually facing surfaces of the components which are to be connected expediently coming into contact with one another once the end position of the first fitting step has been reached. The use of a connecting element with two same-direction threaded sections of different pitches means that the components advance towards one another slowly, the advancement speed depending on the difference between the thread pitches of the two threaded sections. It is possible here for very coarse threads to be used, since it is only the difference between the respective thread pitches which is a measure of the advancement speed of the components. Thus, just a small difference between the thread pitches here means that the components advance towards one another at a low speed during the screw-connection operation. Such connecting elements with coarse threads are cost-effective to produce and are capable of absorbing high forces.

The low advancement speed reduces the risk of the components being pressed against one another with undesirably high force once the predetermined final angle value has been reached. As a result of the small amount of axial displacement per screw revolution, slight deviations, for example, in the surface characteristics of the components do not result in the components being destroyed inadvertently. The component contact surfaces, which butt against one another following the first fitting step, are only pressed against one another by a small torque, which, in the second fitting step, is usually exceeded in any case once the predetermined final torque value has been reached, with the result that the risk of the connection being inadvertently tightened too much is reduced.

Following termination of the first fitting step, the connecting element is located in a very specific angular position, which is known to the automatic fitting machine, with the result that, for example once there has been a change of tools, the fitting tool can easily engage in the wrench attachments of the connecting element.

In the second fitting step, torque-controlled definitive tightening of the connection takes place until the predetermined final torque value has been reached. This ensures that the connection has a retaining force which is adapted to the respective requirements. Thus, damage to materials, for example as a result of over-expansion, is avoided. The use of the connecting element with two same-direction threaded sections makes it possible to achieve a high screw force with just a low screw tightening moment.

The process is advantageously suitable when using at least two connecting elements, the longitudinal axes of which are preferably aligned parallel to one another. It is possible for a plurality of connecting elements to be tightened simultaneously by one automatic fitting machine. Following termination of the first fitting step, all the studs assume the same angular position, this rendering renewed attachment of the fitting tool easier.

Prior to the rotary-angle-controlled preliminary tightening, the stud first of all is expediently pre-fitted in one of the components and then, for further screw-connection, is brought, together with the first component, into alignment with the bore of the second component. This preliminary step means that the operation of tightening the screw is separate from that of positioning the components. The studs can be pre-fitted in the first component in a position which is favorable for fitting purposes, the stud, in this pre-fitted position, being retained in captive fashion in the first component.

Both a stud and a union nut are suitable as the connecting element for carrying out the process.

The stud has a marking which indicates the angular position of the stud. This marking can be provided by the shape of the screw head, which is preferably designed symmetrically with respect to at most one longitudinal plane of the stud. According to a further refinement, it is also contemplated for the screw head to be of completely non-symmetrical design. This permits immediate recognition of the angular position of the stud both by optical and by sensory means, with the result that the fitting tool can automatically be brought into the engagement position with the screw head.

In each case one screw head may be provided on the two end sides of the stud, in order to make it possible, depending on the given design, for the studs to be screwed into the component from different sides.

The beginning of the thread and the end of the thread of a threaded section are expediently located in a common longitudinal plane of the stud. In this respect, the thread itself is also aligned in an angular position which can be recognized by the automatic fitting machine, which makes it possible for the threaded section to be screwed into the respective components, and unscrewed therefrom, with precision.

The union nut which is suitable for carrying out the process has a first threaded section, which is designed as an internal thread, extends over not more than approximately half the length of the union nut and is adjoined by a thread-free inner section. A first embodiment provides that the second, same-direction threaded section of different pitch is also designed as an internal thread, the thread-free section being arranged between the two internal threads. Another embodiment provides that the second threaded section is designed as an external thread on the outside of the union nut. In this case, one section of the union nut is designed as a nut head, which advantageously has a larger diameter than the external thread.

The union nut is suitable for screw-connecting two threaded stubs.

Other objects, advantages and novel features of the present invention will become apparent from the following detailed description of the invention when considered in conjunction with the accompanying drawings.

BRIEF DESCRIPTION OF THE DRAWINGS

FIGS. 9a–9d show the operation of screw-connecting two components using a union nut with two same-direction internal threads, utilizing preferred embodiments of the present invention;

FIGS. 10a, 10b show the process according to FIG. 9 using the example of an injection line;

FIGS. 11a–11d show the operation of screw-connecting two components using a union nut of a different embodiment.

DETAILED DESCRIPTION OF THE DRAWINGS

Figure 1A:
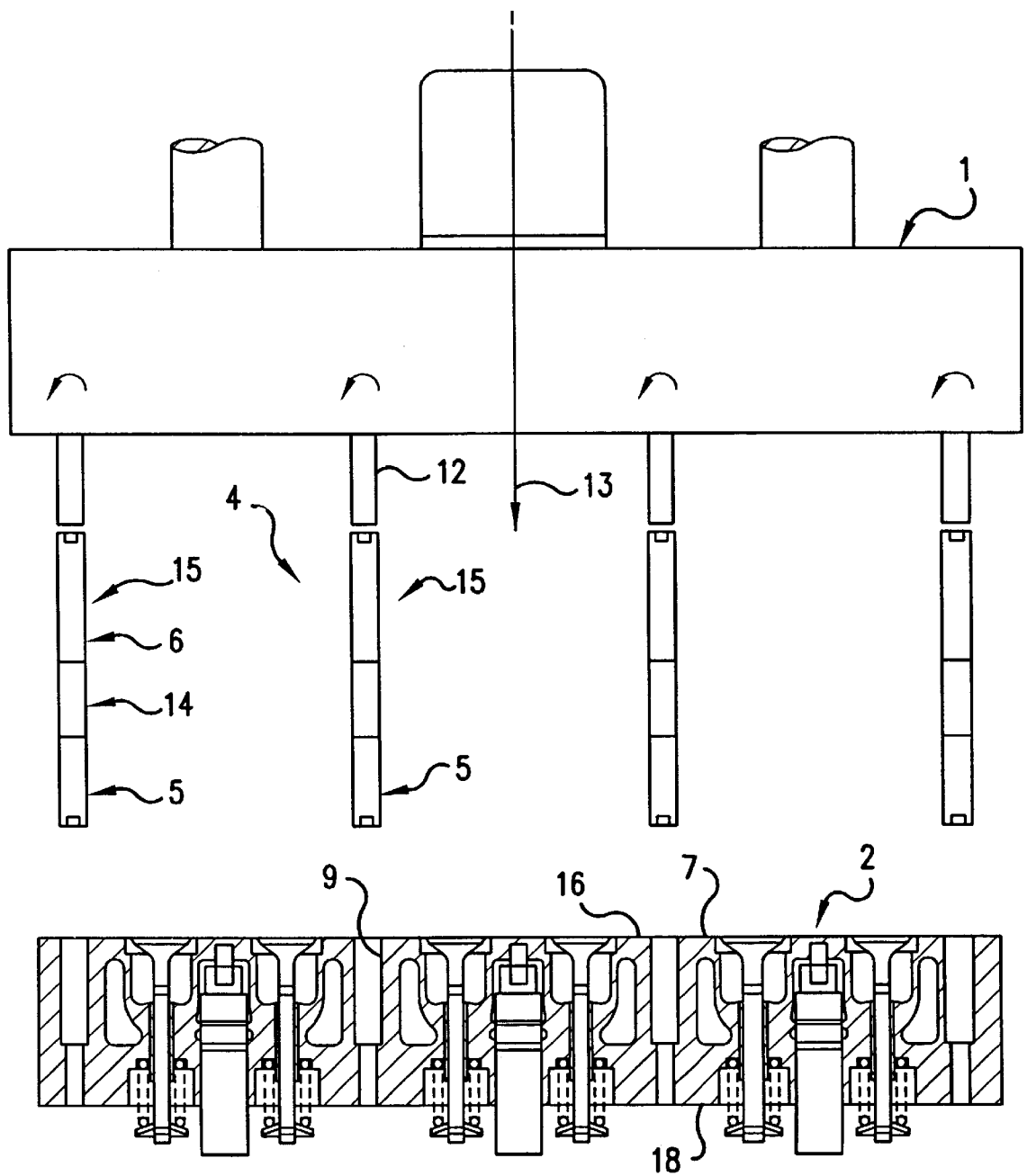
FIGS. 1a–1e are schematic part sectional views which show the operation of fitting a cylinder head on a crank housing in various process steps, in accordance with preferred embodiments of the present invention.

FIGS. 1a–1d show side views of the operation of fitting a cylinder head on a crank housing in various process steps; FIG. 1e shows a plan view of the cylinder head once fitting has been completed. During preliminary fitting according to FIG. 1a, first of all the connecting elements 4, which are designed as studs 15, are received by the fitting tools 12 of an automatic fitting machine 1 and screwed into threaded bores 9 of a first component 2—the cylinder head 16—in the direction of the arrow 13, the surface 7 (cylinder-head end with the individual combustion-chamber sections) of the cylinder head 16 facing the automatic fitting machine. The studs 15 have two threaded sections 5, 6, which extend on opposite axial end regions of the studs. The two threaded sections 5, 6 are separated by a thread-free screw shank 14.

For preliminary fitting, the studs 15 are screwed into the threaded bores 9 of the cylinder head 16, the first threaded section 5 of the studs engaging in the thread of the threaded bores 9. According to FIG. 1b, the studs 15 are screwed into the cylinder head 16 to such an extent during preliminary fitting that the studs project beyond the surface 18 (control side) of the other side of the cylinder head 16. The studs 15 are thus retained in captive fashion on the cylinder head 16; following termination of the preliminary-fitting operation, fitting completion, which is shown in FIGS. 1b–1d, can take place.

Figure 1B:
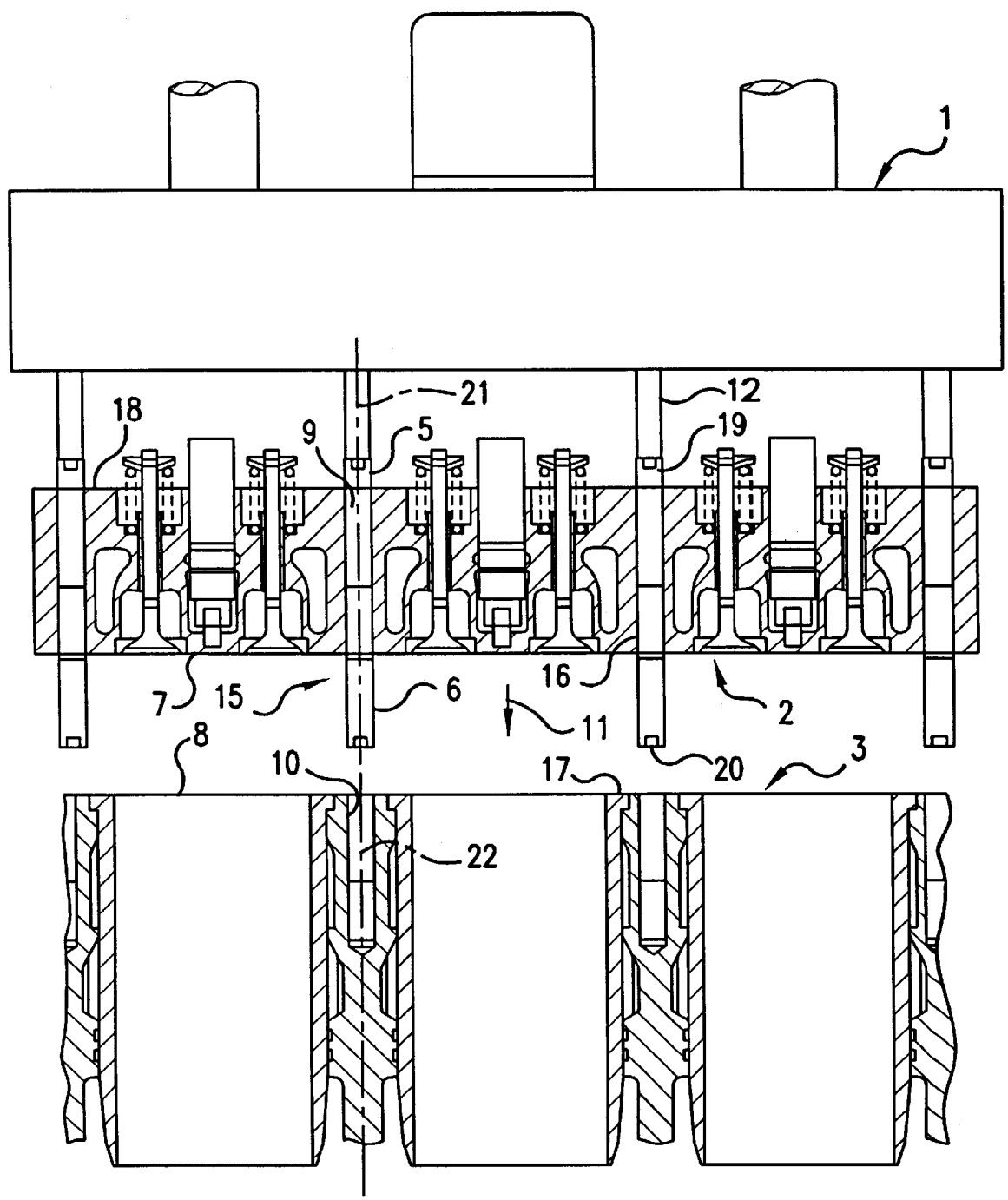

According to FIG. 1b, the automatic fitting machine 1 acts on the opposite side of the studs 15, once the cylinder head 16, together with the studs 15, has been rotated through 180° and brought into the position which is suitable for completing the fitting operation, the surface 18 of the cylinder head 16 facing the automatic fitting machine in said position. For this purpose, both sides of the studs 15 are provided with screw heads 19, 20, in which the fitting tools 12 of the automatic fitting machine 1 can engage and which make it possible for the beginning of the thread to be oriented in the correct direction in relation to the screw heads. It is thus possible, without the position of the automatic fitting machine being changed, for there to be a change in screw-connection direction from arrow direction 13 during preliminary fitting according to FIG. 1a to arrow direction 11 according to FIGS. 1b, 1c for completing the fitting operation, the change in screw-connection direction taking place relative to the component 2 (the cylinder head). Following termination of the preliminary-fitting operation, the longitudinal axes 21 of the studs 15 which are pre-fitted in the threaded bores 9 are in alignment with the longitudinal axes 22 of the threaded bores 10 of the second component 3, namely the crank housing 17, which is to be screw-connected. The cylinder head 16 with the studs 15 is displaced in the fitting direction 11 until such time as the second threaded section 6 of the studs 15 engages in the threaded bores 10 of the crank housing 17. The threaded bores 10, which are designed as blind bores, are only provided with a thread in their section adjacent to the base, with the result that the second threaded section 6 of the studs 15 projects far into the threaded bores 10 until the respective threads begin to engage.

Figure 1C:
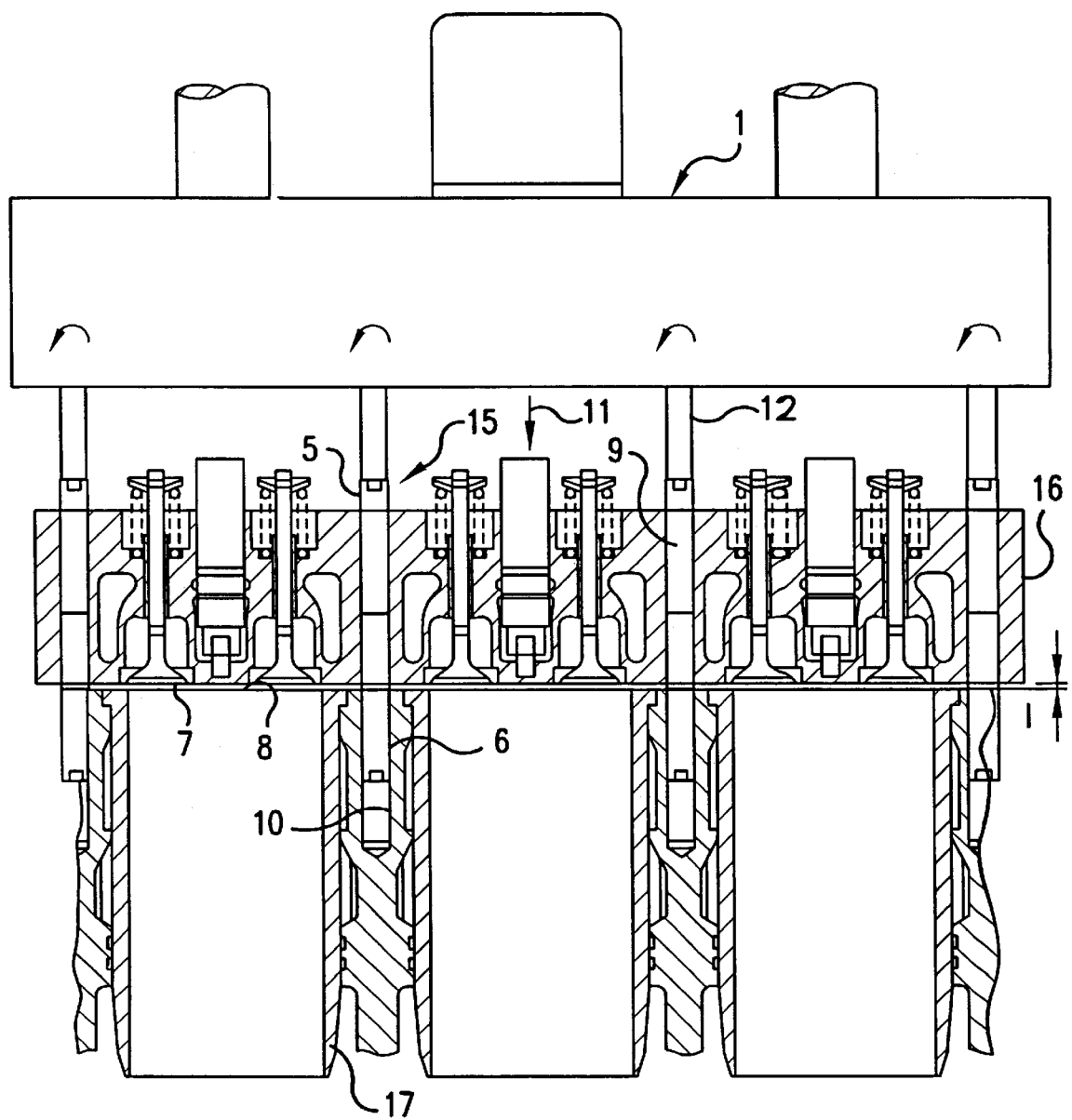
Figure 1D:
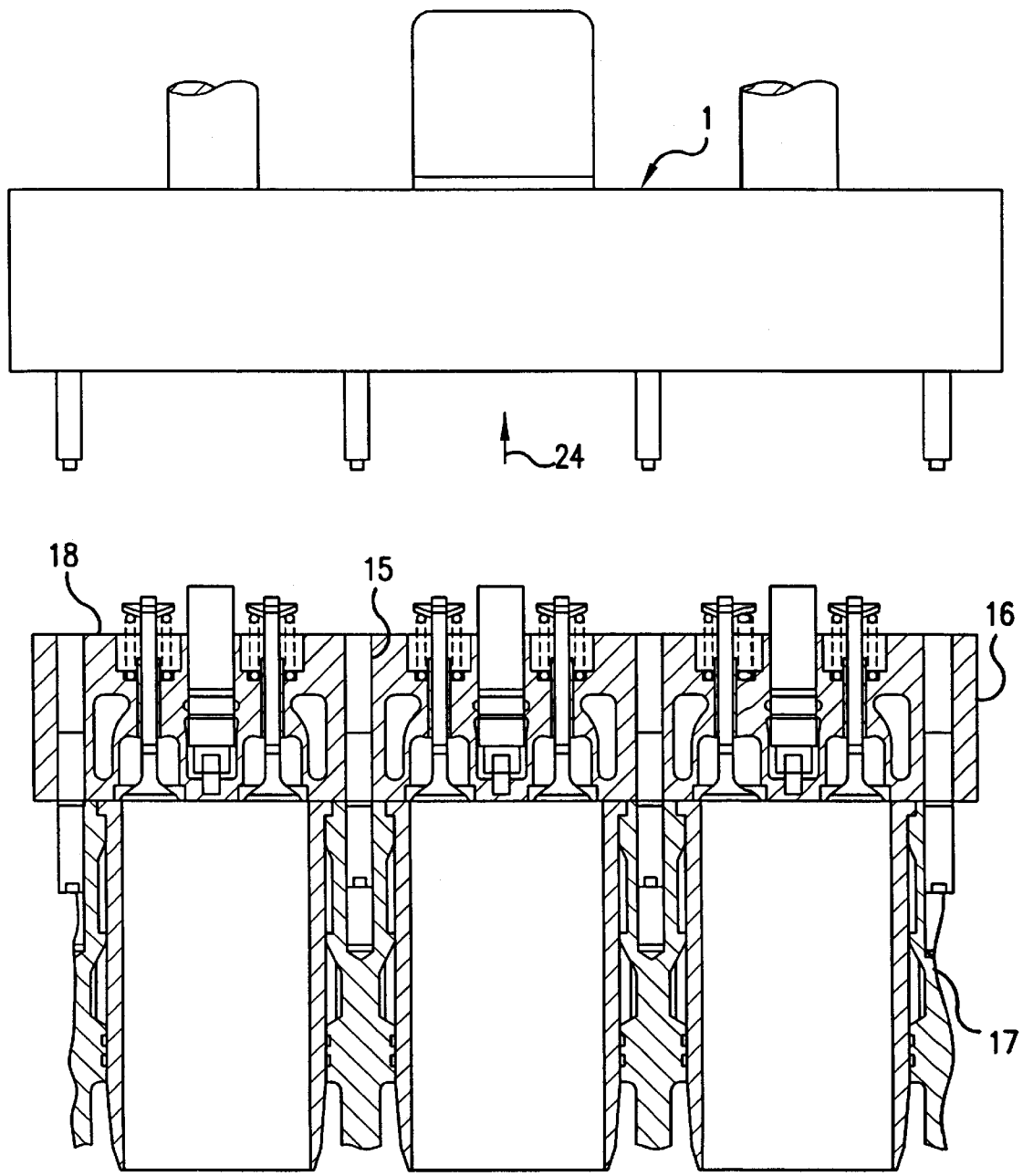
Figure 1E:
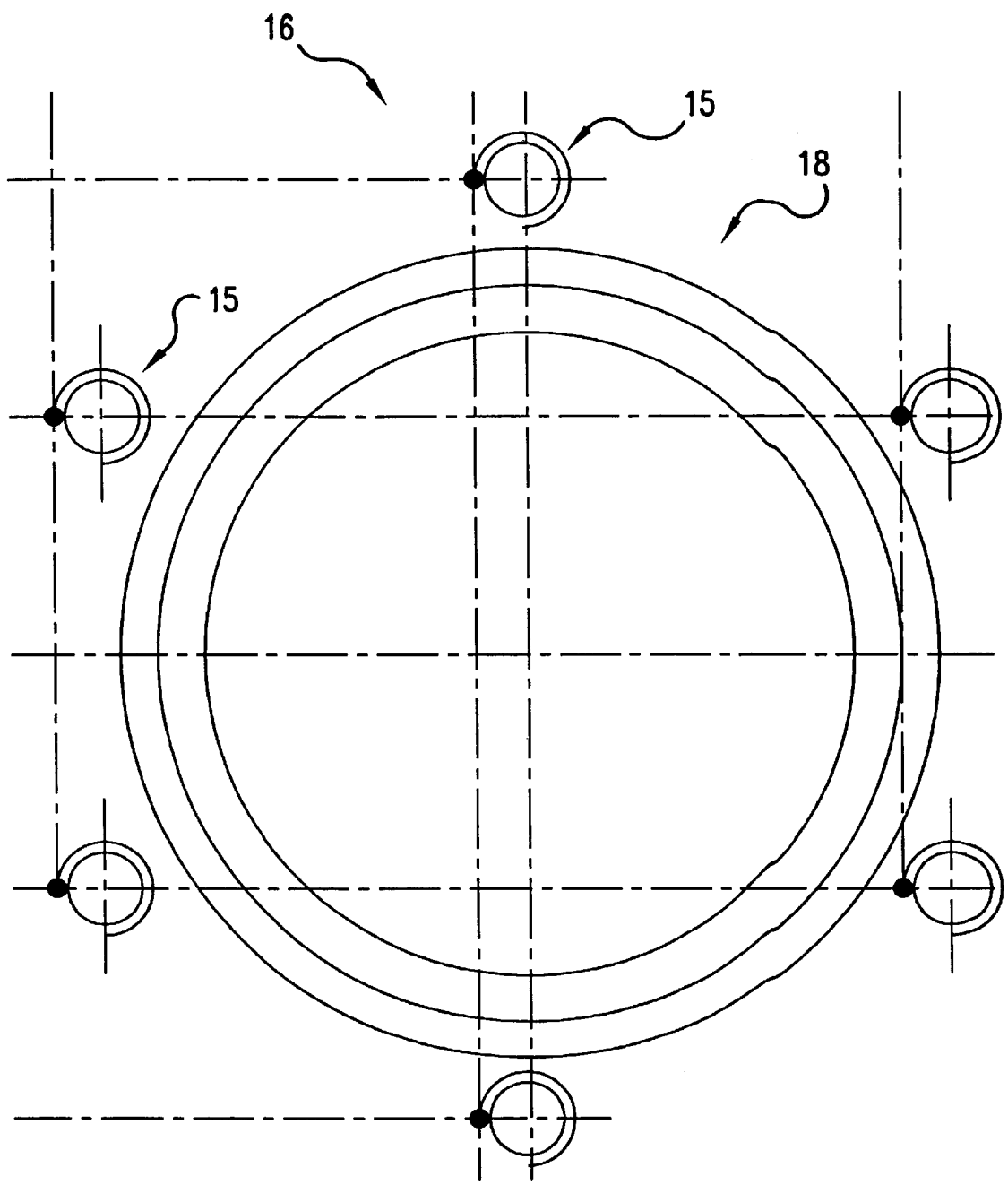

According to FIG. 1c, the cylinder head 16 with the pre-fitted studs 15 is advanced towards the crank housing 17 in the direction of the arrow 11 until such time as the thread of the second threaded section 6 of the studs 15 just begins to engage in the thread of the threaded bore 10 of the crank housing 17; in this position, the mutually facing surfaces 7 and 8 of the cylinder head 16 and of the crank housing 17, respectively, are spaced apart by a small distance l.

The fitting tools 12 of the automatic fitting machine 1, which engage in the screw heads of the studs 15, then begin to rotate in the direction of rotation 23, with the result that the second threaded section 6 of the studs 15 is screwed into the thread of the threaded bores 10 of the crank housing 17. The difference between the threads of the studs 15 causes the cylinder head 16 to advance towards the crank housing 17. The threaded bore 10 and the corresponding second threaded section 6 of the stud 15 are provided with a coarser thread of larger pitch than the first threaded section 5 of the stud 15 and the corresponding thread of the threaded bore 9 in the cylinder head 16. With every revolution of the stud 15, the threaded section 6 is screwed into the thread of the crank housing 17 to a deeper extent than the threaded section 5 is moved through the corresponding thread of the cylinder head 16; the difference between the pitches of the two threaded sections 5, 6 corresponds to the axial adjustment or advancement of the cylinder head towards the crank housing per screw revolution. The distance l between the components is reduced constantly with every screw revolution until, after n revolutions, the components butt directly against one another, with the result that the surfaces 7, 8 are in contact with one another.

The advancement of the two components towards one another, which expediently takes place until there is contact between the mutually facing surfaces, is brought about in the first fitting step, as preliminary tightening, with the aid of the rotary-angle-controlled tightening method. In this case, the fitting tools 12 are rotated by a certain angle, which can be set beforehand. Since there is no need here for any permanent monitoring of the tightening moment to take place, the preliminary tightening in the first fitting step can take place at a high rotary-angle speed.

In the following, second fitting step, the studs 15 are screwed in by the fitting tool 1 until a predetermined final torque value has been reached. The second fitting step can take place using the same fitting tools 12 or else, once the fitting tool has been changed, using another device equipped with a torque-monitoring means. Even if the tools are changed, the fitting tools can easily be inserted into the screw heads of the studs 15 since the angular position of the screw heads following termination of the first fitting step is known and all the screw heads are expediently located in the same angular position. Starting from this angular position, each stud 15 is then screwed in until the final torque value has been reached, it being possible, following termination of the screw-connection operation, for each stud to be located in a different angular position. The stipulation of a final torque value ensures that the studs are not screwed into the crank housing beyond a permissible extent.

Following termination of the screw-connection operation, the components 16, 17 are firmly screw-connected to one another and the automatic fitting machine 1 is removed from the cylinder head 16 in the direction of the arrow 24, FIG. 1d. Following termination of the screw-connection operation, the studs 15 have advantageously been screwed into the cylinder head 16 to the full extent, with the result that the axial end side of the studs 15 does not project beyond the surface 18 of the cylinder head.

It can be seen from the plan view of FIG. 1e that a plurality of studs 15 are arranged one in front of, and behind, the other in the plane of the surface 18 of the cylinder head 16, in particular around the circumference of the cylinder-covering combustion-chamber regions of the cylinder head. In the illustration according to FIG. 1e, all the studs 15 are oriented at the same angle; such an angular orientation is achieved following termination of the first fitting step. The same angular orientation of all the studs facilitates simultaneous engagement of the fitting tools and simultaneous tightening of all the studs.

Figure 2A:
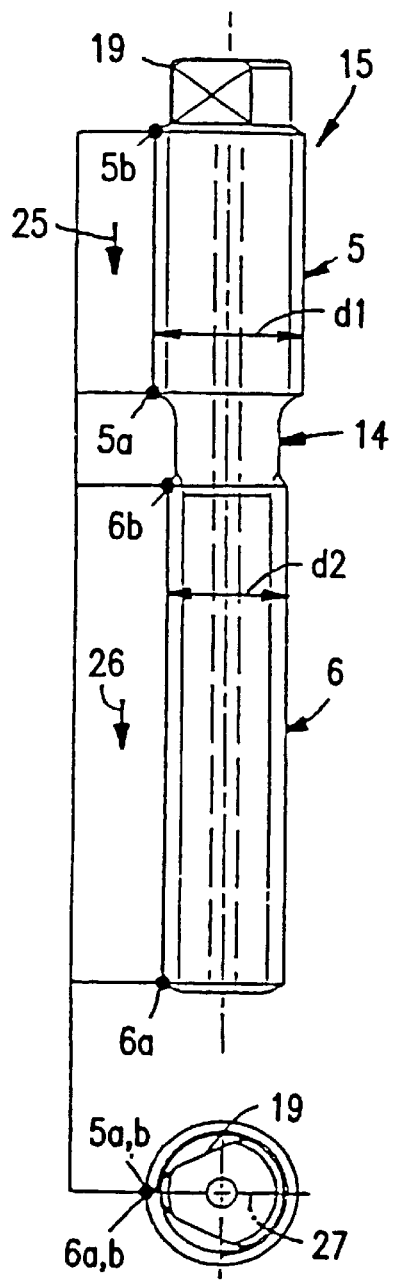
FIGS. 2a–2c are respective side and end views which show various embodiments of studs each with two same-direction threaded sections, constructed according to preferred embodiments of the invention.
Figure 2B:
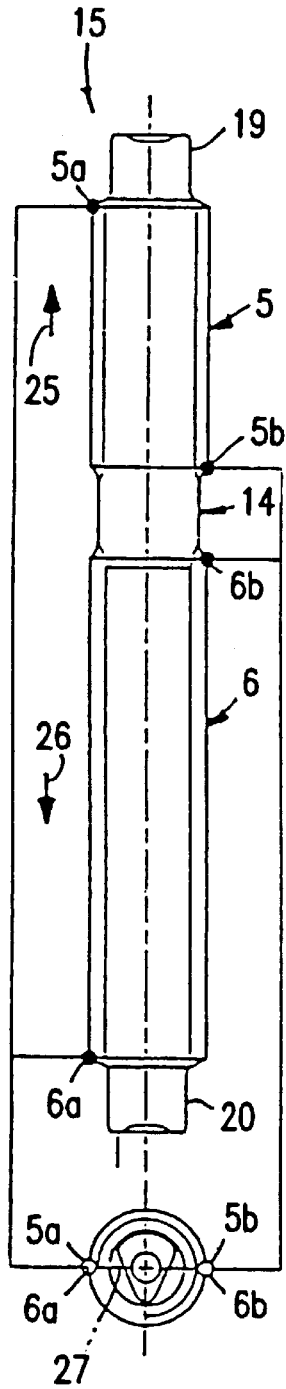
Figure 2C:
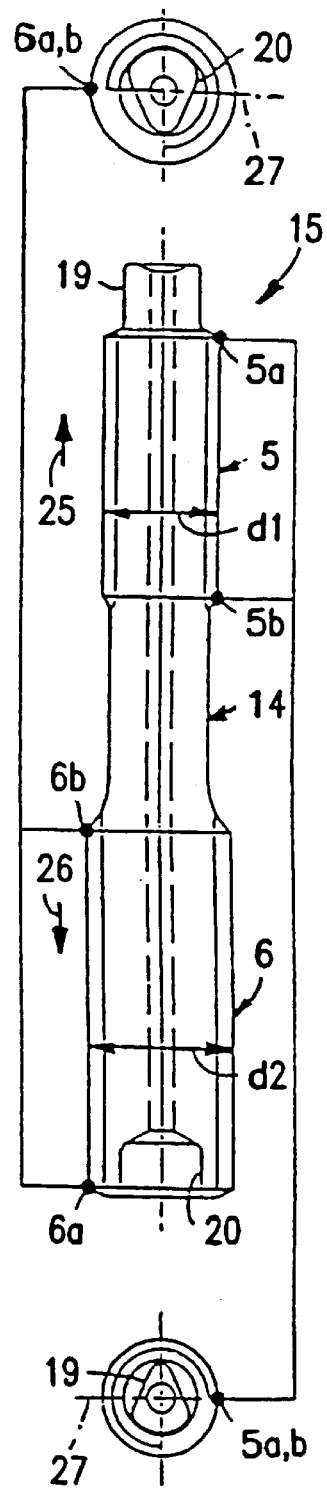

FIGS. 2a to 2c each show different embodiments of a stud 15. The studs 15 are each illustrated in side view and in plan view.

FIG. 2a provides that the first threaded section 5 of the stud 15 has a larger diameter d1 than the second threaded section 6 of diameter d2. The two threaded sections 5, 6 of same-direction pitch are separated from one another by the thread-free screw shank 14, which has a slightly smaller diameter than the second threaded section 6. The various fitting steps take place in the direction of the arrows 25, 26, it being the case that preliminary fitting—preliminary fitting of the stud in the first component—in the arrow direction 25 takes place in the same direction as fitting completion-rotary-angle-controlled preliminary tightening and torque-controlled definitive tightening—in arrow direction 26. For preliminary fitting, the stud 15 is first of all inserted, by way of the second section 6 of smaller diameter, through a threaded through-bore in the first component until such time as the first threaded section 5 engages in the thread of the first component. Fitting is then completed in the same fitting direction, the second threaded section 6, which has a thread of larger pitch than the first threaded section 5, engaging in the corresponding thread of the second component. Since preliminary fitting and fitting completion take place in the same direction, it is sufficient for just one screw head 19 to be provided on the stud 15, said screw head being arranged in the region of the end side adjacent to the first threaded section 5.

The marked points 5a, 6a each designate the beginning of the thread of each threaded section 5, 6; correspondingly, the points 5b, 6b designate the end of each threaded section. As can be seen from FIG. 2a, all the points 5a, 5b, 6a, 6b are located in a common longitudinal plane 27 of the stud 15. It can be seen from the plan view of FIG. 2a that the screw head 19 is designed symmetrically with respect to said longitudinal plane 27. The alignment of the beginnings of the threads and the ends of the threads and of the screw head in the same direction makes it possible for the threads to engage in the corresponding bores of the respective components precisely and in a manner which can be determined beforehand.

FIG. 2b provides that the two threaded sections 5 and 6 of the stud 15 have the same diameter. Such a stud with threaded sections of the same diameter has been used in the case of the previously described process in the example of FIGS. 1a to 1e. The first threaded section 5 first of all is pre-fitted in the first component in arrow direction 25 and then, for completing the fitting operation, is screw-connected in the opposite direction of arrow 26. The opposite fitting directions of the individual fitting steps necessitate screw heads 19, 20 on the opposite axial end sides of the stud 15. Both screw heads 19, 20 are designed as stub-like wrench attachments. The beginnings of the threads and ends of the threads of the two threaded sections, once again, are located in a common longitudinal plane 27 of the stud 15, the beginnings of the threads 5a, 6a of the two threaded sections and the ends of the threads 5b, 6b being located on different sides of the stud 15. The screw head is aligned with its narrow side at an angle of 90° with respect to the longitudinal plane 27.

FIG. 2c provides that the second threaded section 6 has a larger diameter d2 than the first threaded section 5 of diameter d1. The fitting direction, as in the example of FIG. 2b for the preliminary-fitting operation, is first of all in the direction of the arrow 25, the fitting tool engaging in the opposite screw head 20. Following termination of the preliminary-fitting operation, fitting is completed in the opposite direction, according to arrow 26; the fitting tool then acts on the screw head 19, which is adjacent to the first threaded section 5. The first screw head 19 is designed as a stub-like wrench attachment and the second screw head 20 is designed as a socket-like wrench attachment. The socket-like wrench attachment, which is to be operated by a wrench of complementary shape, is distinguished by a space-saving configuration. All the starts of the threads and ends of the threads, once again, are located in a common longitudinal plane 27, it being the case that the beginning of the thread 5a and the end of the thread 5b of the first section 5 are both arranged on one side of the stud and the beginning of the thread 6a and the end of the thread 6b of the second threaded section 6 are arranged on the diametrically opposite side of the stud 15.

FIG. 3 shows various embodiments of the screw heads 19 and 20. All the embodiments have in common the fact that the wrench attachment of the respective screw head is designed symmetrically with respect to at most one longitudinal plane of the stud. This can advantageously result in the beginning of the threads of the threaded sections being aligned with respect to the wrench attachment. Some embodiments are also of completely non-symmetrical design. It is thus easily possible to determine the angular position of the stud at any one time. All the screw heads may be designed as socket-like or stub-like wrench attachments.

Figure 3A:
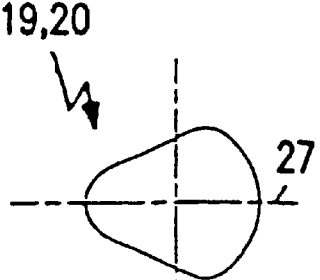
FIGS. 3a–3r are end views which show various screw-head embodiments of the present invention.

FIG. 3a provides that the screw head is symmetrical with respect to the longitudinal plane 27 of the stud. The screw head has two diametrically opposite part-circle-shaped sections of different radii, the section of larger radius being connected, via tapering flanks, to the section of smaller radius.

Figure 3B:
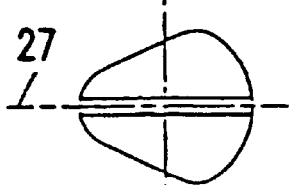

The outer configuration of the screw head according to FIG. 3b corresponds to that from FIG. 3a; also provided is a groove, which extends along the longitudinal plane 27.

Figure 3C:
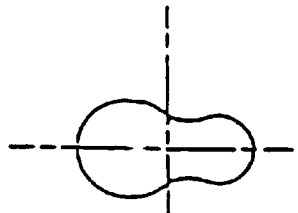

The screw head according to FIG. 3c, which is likewise designed symmetrically with respect to one longitudinal plane, has two part-circle-shaped sections of different radii, the transition between the two sections being made via likewise part-circle-shaped flanks.

Figure 3D:
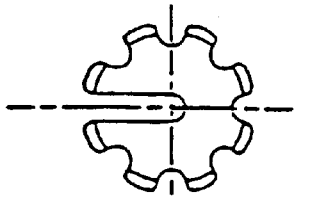

The screw head according to FIG. 3d has eight radially outwardly directed prongs distributed uniformly over the circumference. A groove-shaped incision is provided, this extending in the plane of symmetry and being somewhat longer than the radius of the screw head.

Figure 3E:
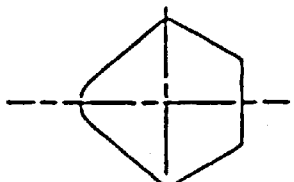

The screw head according to FIG. 3e comprises five straight flanks which are arranged at an angle with respect to one another, two adjacent flanks being connected via a part-circle-shaped section.

Figure 3F:
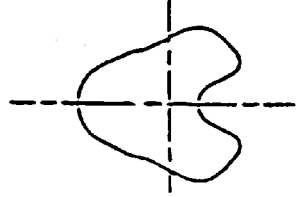

The screw head according to FIG. 3f, which is symmetrical with respect to one longitudinal plane, has a part-circle-section on which two rectilinear flanks diverge. On the side which is remote from the part-circle-shaped section, the flanks are connected to one another by a rounded section which has an approximately semicircular recess.

Figure 3G:
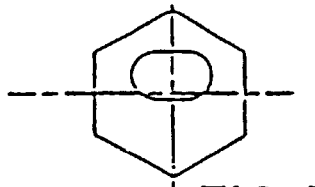

The screw head according to FIG. 3g is designed as a conventional hexagonal screw head, an eccentric recess with two semicircular sections being provided.

Figure 3H:
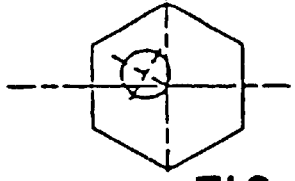

The screw head according to FIG. 3h is of a similar embodiment to that from FIG. 3g, the recess being of a circular cross-section.

Figure 3I:
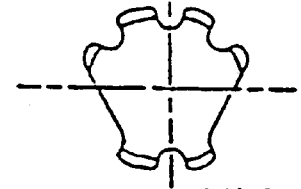

The screw head according to FIG. 3i is provided, in the same way as that from FIG. 3d, with radially outwardly directed prongs, in each case one prong being missing from opposite sides of the plane of symmetry. The points from which prongs are missing are arranged such that four prongs are arranged on one side of the screw head and two prongs are arranged on the opposite side of the screw head.

Figure 3J:
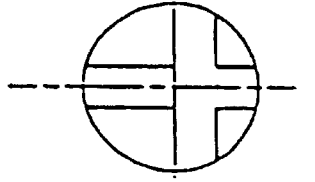

The screw head according to FIG. 3j is of circular cross-section, two grooves which are located at right angles with respect to one another being provided and one of these grooves being located outside a longitudinal plane of the stud.

Figure 3K:
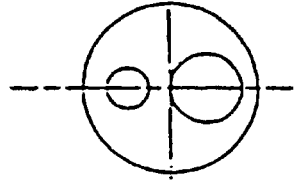

The screw head according to FIG. 3k is likewise of a circular cross-section; furthermore, two eccentric, circular recesses of different radii are provided.

Figure 3L:
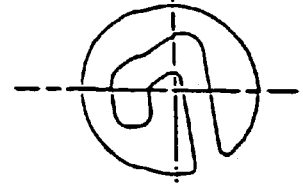

The screw head according to FIG. 3l is likewise of a circular cross-section; a groove-shaped recess approximately in the cross-sectional configuration of the number "7" is provided, the long leg of the groove breaking through the outer contour of the screw head. The screw head according to FIG. 3l is of a completely non-symmetrical cross-section.

Figure 3M:
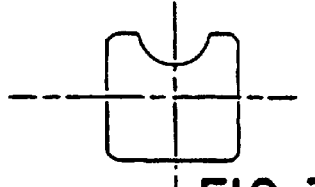

The screw head according to FIG. 3m is of a square cross-section, one flank of the square having a semicircular recess.

Figure 3N:
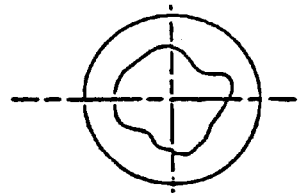

The screw head according to FIG. 3n is of a circular cross-section with an irregular recess in the inside, as a result of which the screw head has a non-symmetrical cross-sectional configuration.

Figure 3O:
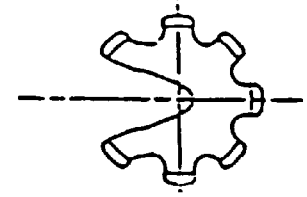

The screw head according to FIG. 3o is provided, in the same way as that of FIGS. 3d and 3i, with radially outwardly directed prongs, one prong being missing and being replaced by a triangular recess.

Figure 3P:
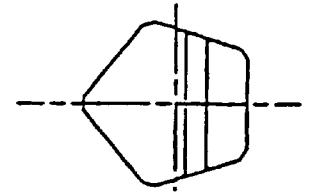

The screw head according to FIG. 3p is of pentagonal design; furthermore, a groove which is located outside the plane of symmetry passes right through it.

Figure 3Q:
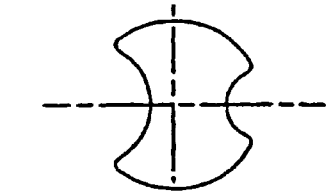

The screw head according to FIG. 3q has a circular cross-sectional configuration; two part-circle-shaped recesses of different radii are provided on diametrically opposite sides.

Figure 3R:
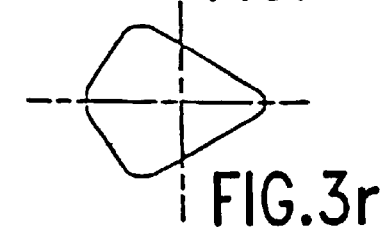

The screw head according to FIG. 3r is of a trapezoidal cross-section.

The various screw-head shapes give a clear indication of the angular position of the studs. In this respect, the non-symmetrical shape of the screw heads, or the screw-head shape which is symmetrical with respect to just one longitudinal plane, constitutes a marking for the respective angular position of the stud, or this can result in clear alignment of the beginning of the threads of the threaded sections with respect to the screw heads.

Figures 4A, 4B:
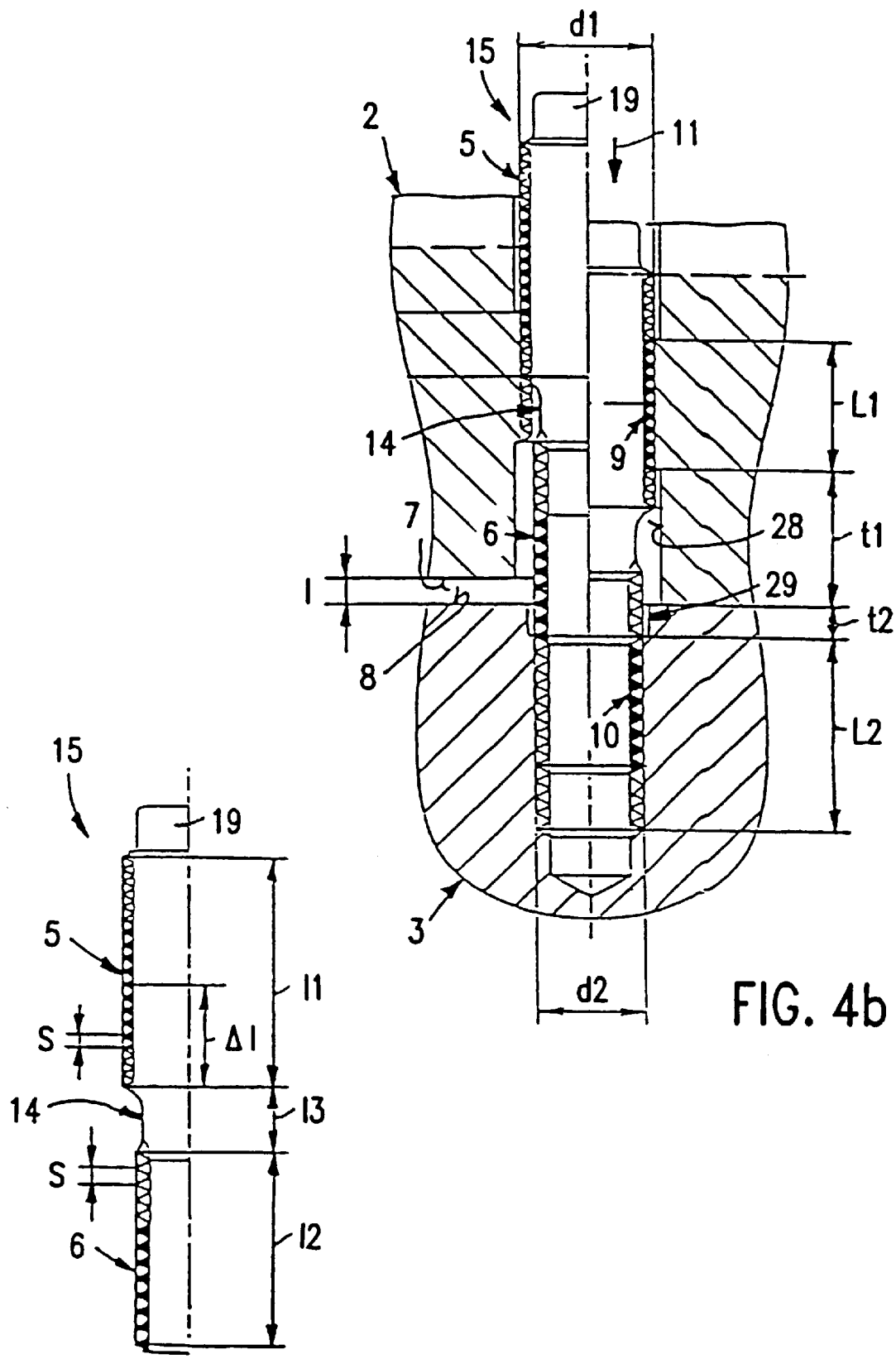
FIGS. 4a–4b are schematic side views which show the dimensions of a stud in relation to the components which are to be connected, according to preferred embodiments of the invention.

FIGS. 4a, 4b show an example for expedient dimensioning of a stud with predetermined proportions of the threaded bores in the two components which are to be screw-connected.

The stud 15 is screwed into the threaded bores 9, 10 of the components 2 and 3, respectively. The stud 15 has two threaded sections 5, 6 of different diameters d1, d2, the first threaded section 5 having a smaller pitch s than the second threaded section 6 of larger pitch S, see FIG. 4a. The threaded section 5 has the length 11 and the threaded section 6 has the length 12. The two threaded sections are separated by the thread-free screw shank 14 of the length 13. A screw head 19 is provided adjacent to the first threaded section 5.

FIG. 4b shows the stud 15 screwed into two different positions in the components 2, 3. In the left-hand half of FIG. 4b, the stud 15 is only screw-connected to the thread of the first threaded bore 9 of the component 2, while the second threaded section 6 of the stud 15 is just beginning to engage in the thread of the second threaded bore 10 of the component 3; the mutually facing surfaces 7 and 8 of the components 2 and 3, respectively, are spaced apart from one another by the distance l. The distance l is selected such that, as a result of the difference between the thread pitches S and s of the threaded sections 6 and 5, respectively, the distance l is closed up following n revolutions of the stud 15; accordingly, the distance l can be calculated from the difference between the thread pitches multiplied by the number n of revolutions.

In the right-hand half of FIG. 4b, the stud 15 has been screwed into the threaded bores 9, 10 of the components 2 and 3 to the full extent, with the result that the surfaces 7, 8 of the components 2, 3 butt against one another.

The threaded bore 9 in the component 2, which has the length L1, is adjoined, in the direction of the second component 3, by a thread-free section 28 of the length t1. The recess in the component 3 is also designed correspondingly. Provided first of all, in the direction facing the component 2, is a thread-free section 29 of the length t2, which is adjoined by the threaded bore 10 of the length L2. The recess in the component 2 is designed as a through-bore and the recess in the component 3 is designed as a blind bore.

In order to proportion the stud 15 such that the components 2, 3 can be screw-connected without any difficulty, provision is made for the length 11 of the first threaded section 5 of the stud 15 to be greater than the length L1 of the receiving thread 9 of the component 2 by a certain amount Δl. The length 13 of the thread-free screw shank 14 of the stud 15 corresponds to the length t1 and t2 of the two thread-free sections 28, 29 in the components 2 and 3, respectively, reduced by the amount Δl. In other words, the length of the first threaded section 5 and of the screw shank 14 of the stud 15 are approximately the same as the length of the threaded bore 9 in the component 2 including the two thread-free sections 28, 29, merely the length ratios of threaded section to thread-free section having been shifted. This has the advantage that the first threaded section 5 of the stud 15, which is designed to be longer than the corresponding threaded bore 9 in the component 2, can be partially screwed into the threaded bore 9 during preliminary fitting and thus retained in captive fashion in the component 2. For completing the fitting operation, the stud 15 is brought, together with the component 2, into alignment with the threaded bore 10 in the second component 3, the thread of the second threaded section 6 of the stud 15 just butting against the beginning of the thread of the threaded bore 10; in this case, the stud 15 has been screwed into the first threaded bore 9 to the extent where the two components 2, 3 are spaced apart with respect to one another by a certain distance l, which is closed up following a predetermined number of revolutions n.

An expedient development provides that the length 12 of the second threaded section 6 is no longer than the receiving thread 10 of the second component 3, which has the length L2. In the position in which it has been screwed in to the full extent, the entire second threaded section 6 of the stud 15 is received by the threaded bore 10 of the second component 3; the first threaded section 5 has also been screwed into the first threaded bore to the full extent, the thread-free section 14 of the stud 15 being located in the region of the thread-free sections 28, 29 of the components 2, 3.

Dimensioning of the stud in dependence on the proportions of the components which are to be screw-connected is expediently determined in the form of an algorithm in a data-processing system.

Figures 5A, 5B:
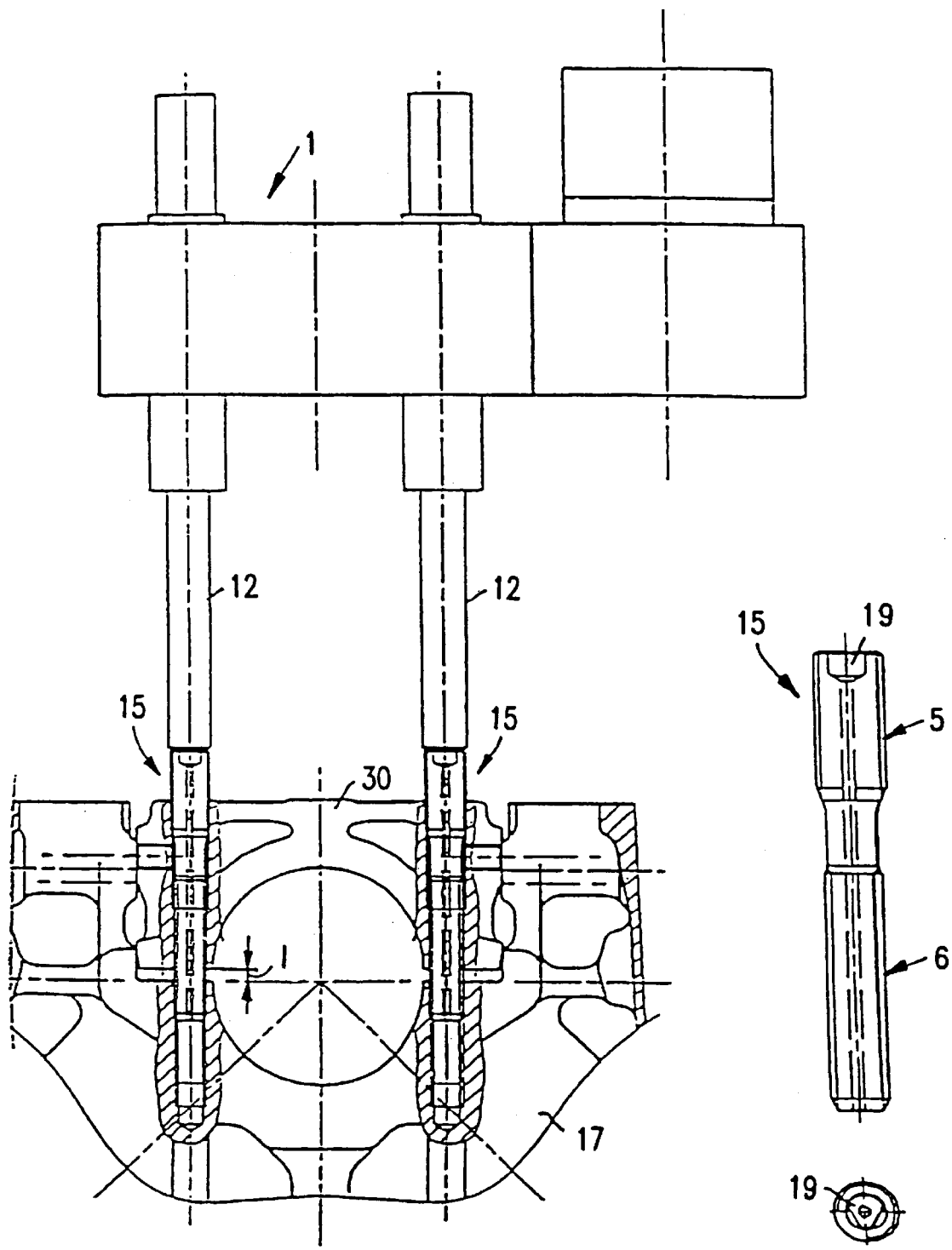
FIGS. 5a–5d show the operation of fitting a crankshaft-bearing cap on a crankshaft housing, utilizing preferred embodiments of the present invention.

FIGS. 5a to 5d show a further exemplary embodiment with reference to the operation of fitting a crankshaft-bearing cap on a crank housing. According to FIG. 5a, two parallel studs 15 are screwed into threaded bores of a crankshaft-bearing cap 30 and a crank housing 17 by the automatic fitting machine 1, via the fitting tools 12. FIG. 5a shows the apparatus at the beginning of the rotary-angle-controlled preliminary-tightening operation; in this position, there is a gap of the width l between the crank housing 17 and the crankshaft-bearing cap 30. According to FIG. 5b, use is made of a stud 15 with two threaded sections 5, 6 of different diameters (section 5 has the larger diameter), said stud being suitable for carrying out preliminary fitting and fitting completion in the same fitting direction. The screw head 19 is designed as a socket-like wrench attachment.

Figure 5C:
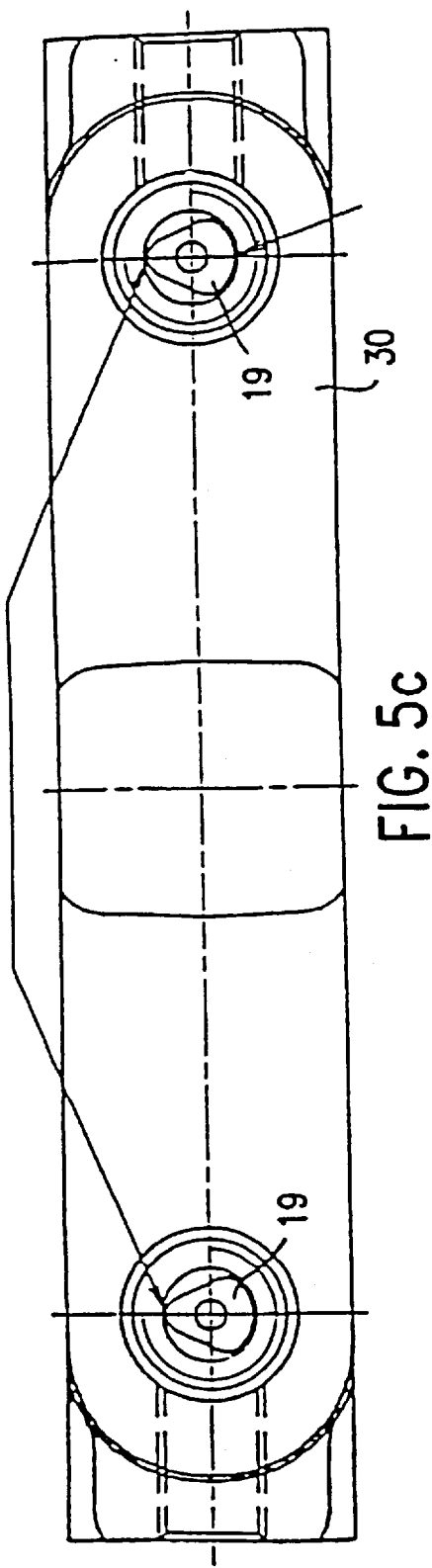
Figure 5D:
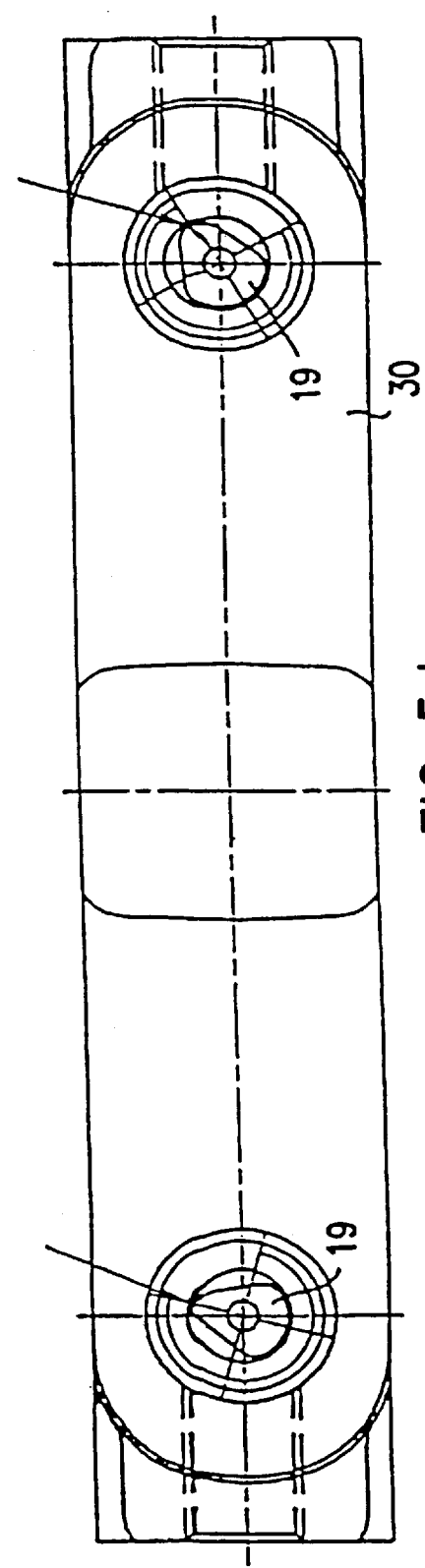

FIGS. 5c and 5d show a plan view of the crankshaft-bearing cap 30 in different stages of the tightening operation. FIG. 5c illustrates the studs at the beginning of the fitting operation, or following completion of the rotary-angle-controlled preliminary-tightening operation; the screw heads 19 of the studs are aligned in the same direction. FIG. 5d shows the studs at the end of the fitting operation. Following the torque-controlled definitive-tightening operation, the studs, having reached a common predetermined final torque value, have separate angular positions. The different angular position may also be brought about by each stud being definitively tightened by a separate tightening torque.

Figures 6A, 6B:
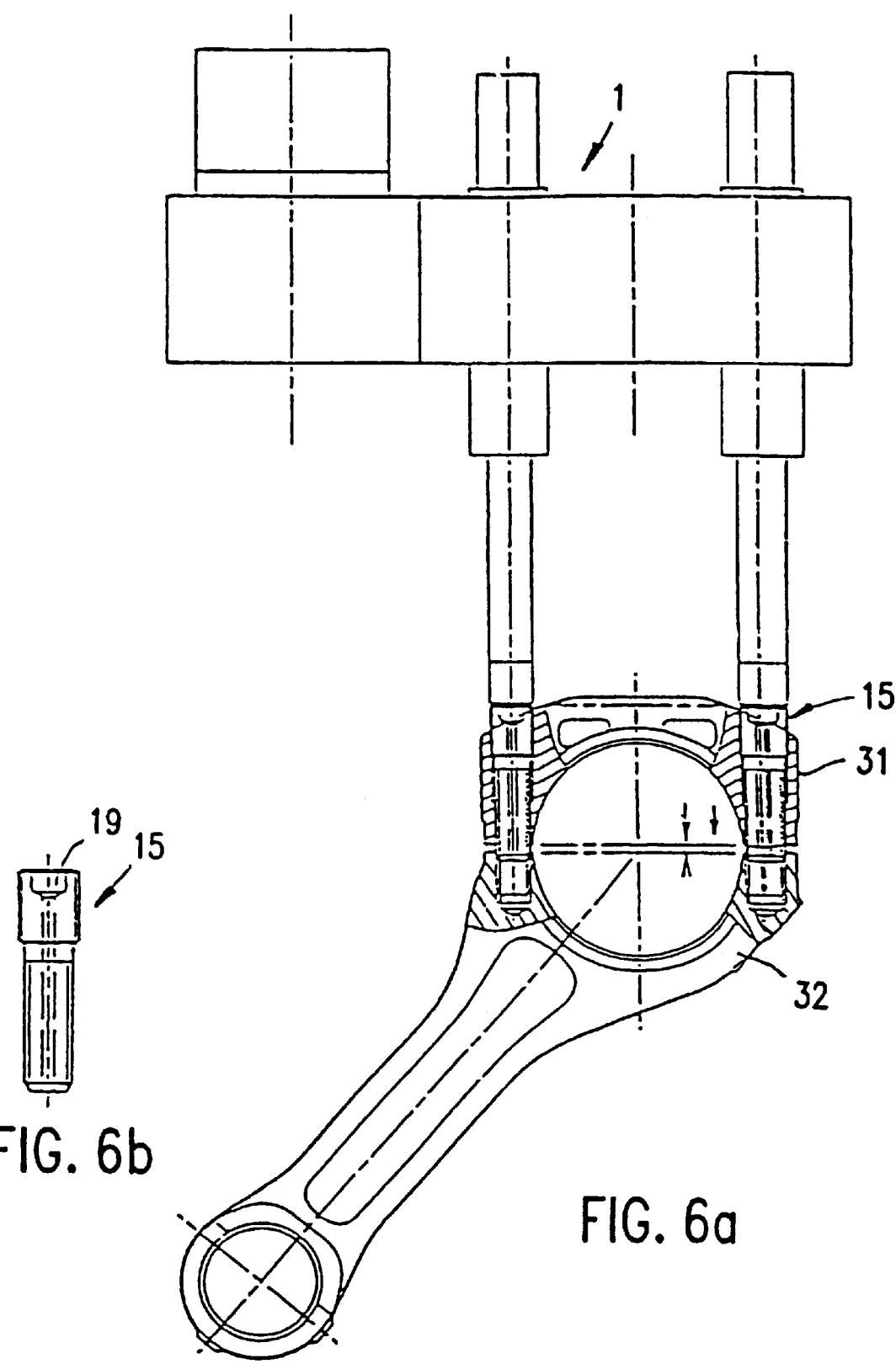
FIGS. 6a, 6b show the operation of fitting a bearing cap on a connecting rod, utilizing preferred embodiments of the present invention.

FIGS. 6a, 6b show the operation of fitting a bearing cap 31 on a connecting rod 32. The threaded sections of the stud 15, once again, have different diameters and the screw head 19 is designed as a socket-like wrench attachment. The studs 15 are set back into the components 31, 32 to the full extent, as a result of which the overall amount of space required is reduced. The different threads, which run in the same direction, mean that studs 15 can be definitively tightened by a low tightening torque, although a high screw force acts between the components. It is also conceivable for studs 15 of identical diameters to be used in the threaded sections. The bearing cap 31 is separated from the connecting rod by breaking (so-called cracking) or pulling. The threaded bores in the connecting rod, however, are produced prior to breaking (cracking). The threaded section of the larger diameter and smaller thread pitch is provided in the bearing cap 31. The threaded section of the smaller diameter and larger thread pitch is located in the connecting rod, the two threaded sections being separated by a thread-free bore section in whose plane the breakage plane between the connecting rod and bearing cap is also located.

In the pre-fitted state of the bearing cap 31 and connecting rod 32, the studs 15 always produce a positively locking connection which acts in every direction and, once fitting has been completed, a frictionally locking connection and positively locking connection likewise acting in every direction are also achieved. The pre-fitted components 31 and 32 move towards one another during fitting completion, the breakage surfaces on the connecting rod and the bearing cap first of all coming into contact before they are braced against one another. A bearing cap 31 which is screw-connected in this way does not need any other elements for securing it against longitudinal and transverse displacement or rotation of the components with respect to one another.

Figure 7A:
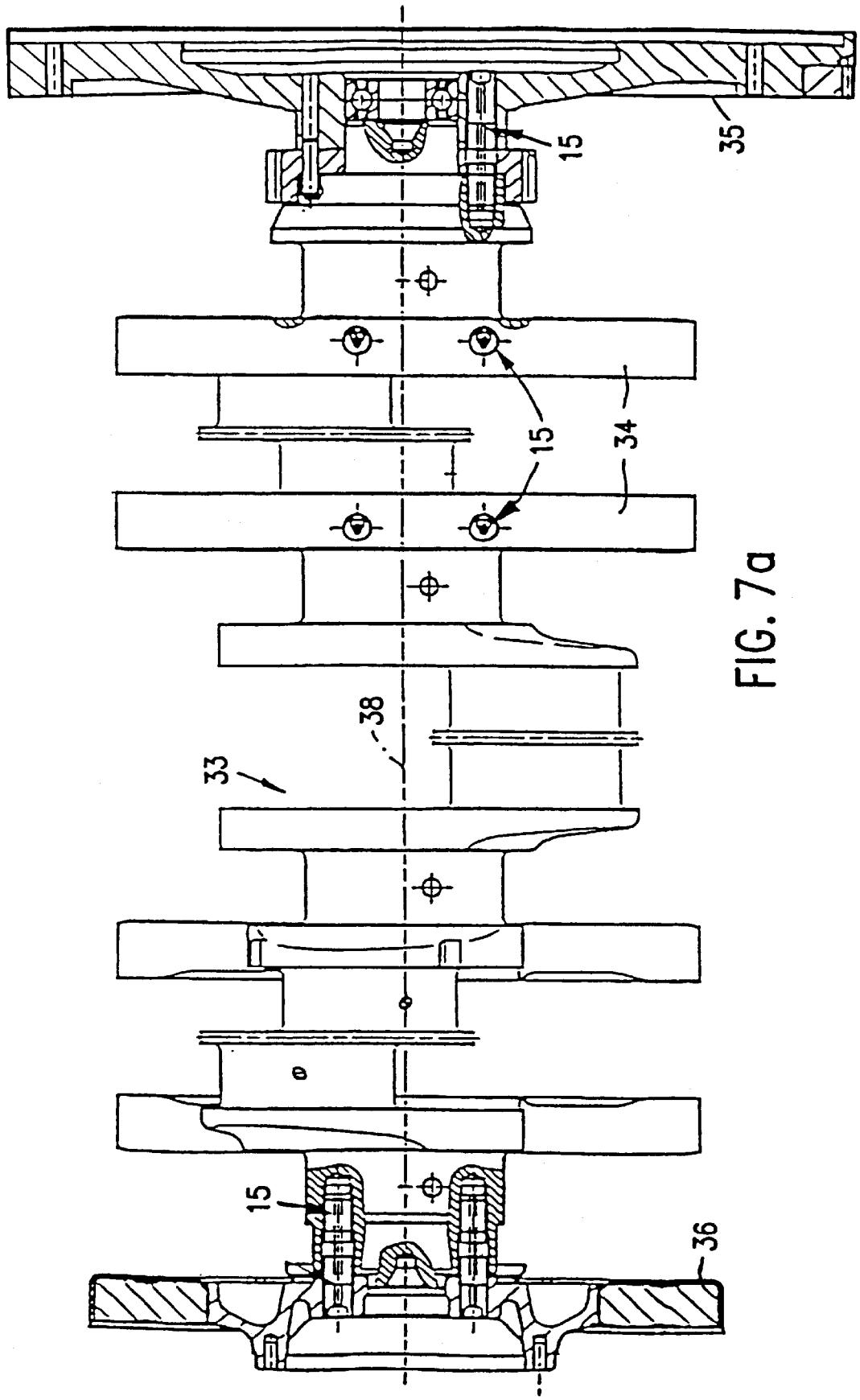
FIGS. 7a, 7b show the operation of fitting a flywheel and a plurality of counterweights on a crankshaft, utilizing preferred embodiments of the present invention.
Figure 7B:
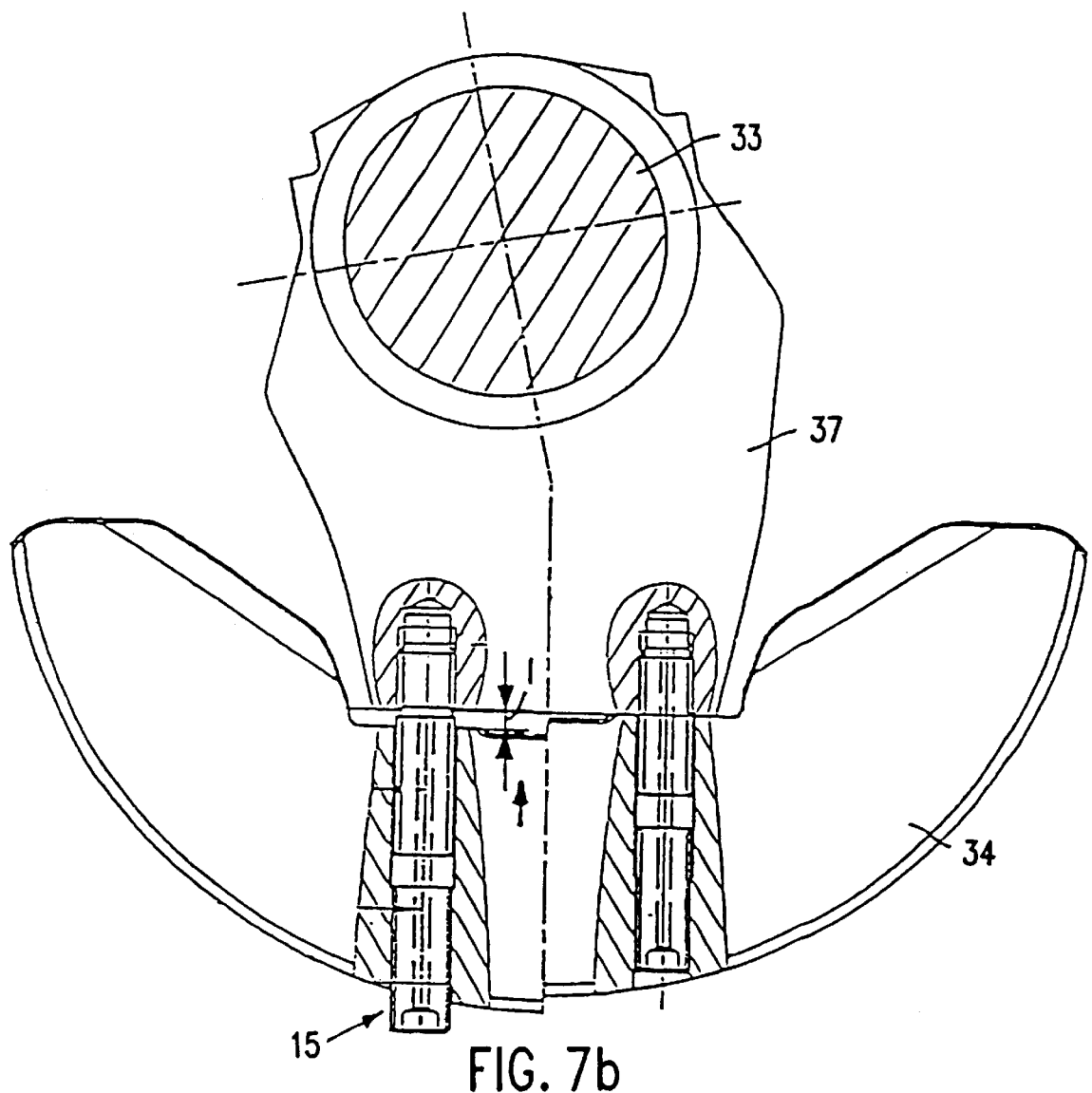

FIGS. 7a, 7b show a crankshaft with a flywheel fitted thereon and a plurality of counterweights. The counterweights 34 are screw-connected to the crankshaft 33 by means of the studs 15, the studs being aligned approximately radially in the direction of the longitudinal axis 38 of the crankshaft. Also provided, at one crankshaft end, is a flywheel 35, which is likewise screwed to the crankshaft 33 via studs 15. The studs 15 of the flywheel 35 are located in an axis-parallel manner with respect to the longitudinal axis 38 of the crankshaft 33. Provided on that side of the crankshaft 33 which is located opposite the flywheel 35 is a further balancing weight 36, which is likewise fastened on the crankshaft by means of studs 15.

FIG. 7b shows a section through the crankshaft 33 with a view of a counterweight 34. The left-hand half of FIG. 7b illustrates the counterweight 34 at the beginning of the fitting operation; the counterweight 34 is still at a distance l from a cam 37 of the crankshaft 33, the counterweight being fastened on said cam. In the right-hand half of FIG. 7b, the counterweight 34 has been definitively tightened on the cam 37.

FIGS. 8a to 8f show various devices and processes for providing threads in pre-drilled components.

Figure 8A:
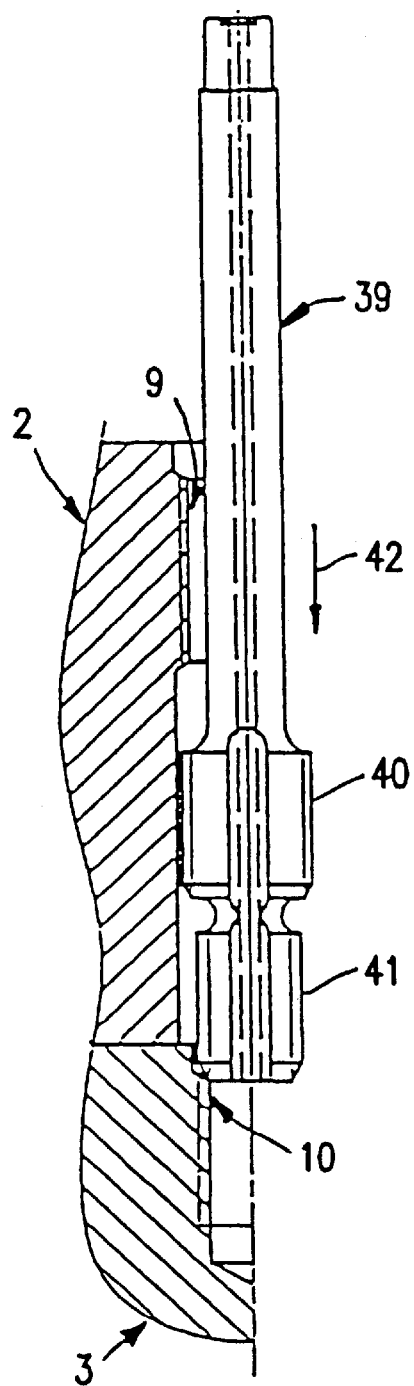
FIGS. 8a–8f show various processes for providing threads in pre-drilled components, utilizing preferred embodiments of the present invention.
Figure 8B:
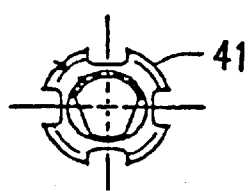
Figure 8C:
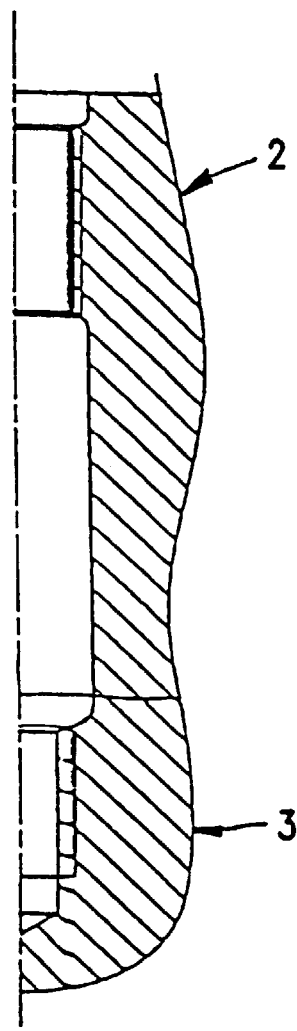

FIGS. 8a to 8c show the production of same-direction threads of different pitches in pre-drilled components 2, 3. The threaded bores 9, 10 in the respective components 2, 3 are produced by the thread-cutting method; alternatively, it is also possible to use non-cutting thread rolling.

The threads are cut using a thread-cutting tool 39 which, in the region of one axial end, has two cutting heads 40, 41 arranged one behind the other, the first cutting head 40 having a larger diameter than the second cutting head 41, which extends as far as the axial end side of the cutting tool 39. The two cutting heads 40, 41 produce threads of different pitches, it being expedient for the first cutting head 40 of larger diameter to produce a thread of smaller pitch than the second cutting head 41. The two threaded bores 9, 10 are advantageously produced in one operation in the direction of the arrow 42, first of all the thread of the threaded bore 9 being cut into the component 2 by the cutting head 40 and then the thread of the threaded bore 10 of the second component 3 being cut by the cutting head 41. The thread of the threaded bore 9 is adjoined by a thread-free section, the diameter of which is dimensioned such that the first cutting head 40 can be guided through without obstruction. The advancement of the cutting tool 39 is advantageously selected in dependence on the speed of revolution and the respective thread pitch.

Figure 8D:
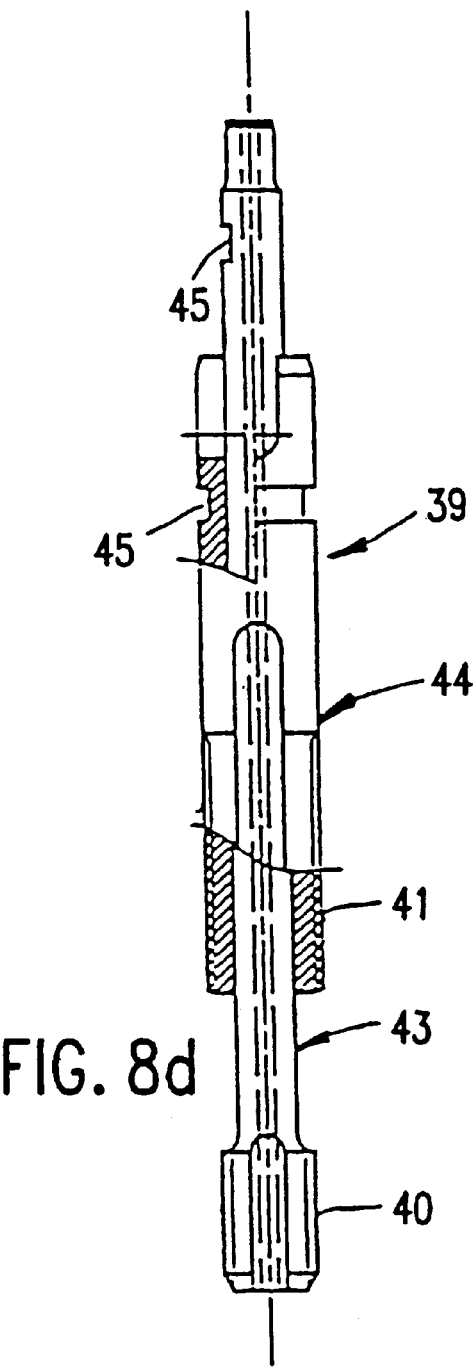
Figure 8E:
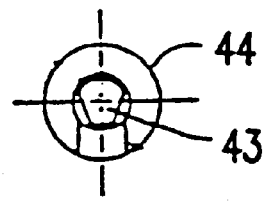

FIGS. 8d, 8e show a two-part embodiment of a thread-cutting tool 39. The cutting tool 39 has a threaded rod 43 with a first cutting head 40 of smaller diameter. The threaded rod 43 can be moved in the axial direction relative to a threaded sleeve 44, the external thread of which is designed as a cutting head 41 of larger diameter. The cutting head 40 on the threaded rod 43 is expediently suitable for cutting a thread of larger pitch than the cutting head 41 on the threaded sleeve 44. On the side which is remote from the respective cutting heads, both the threaded rod 43 and the threaded sleeve 44 have engagement means 45, by means of which the respective components can be secured axially.

It can be seen from the plan view of FIG. 8e that both the threaded rod 43 and the encompassing threaded sleeve 44 have a characteristically shaped screw head, which clearly indicates the angular position of the threaded rod and the threaded sleeve at any one time.

Figure 8F:
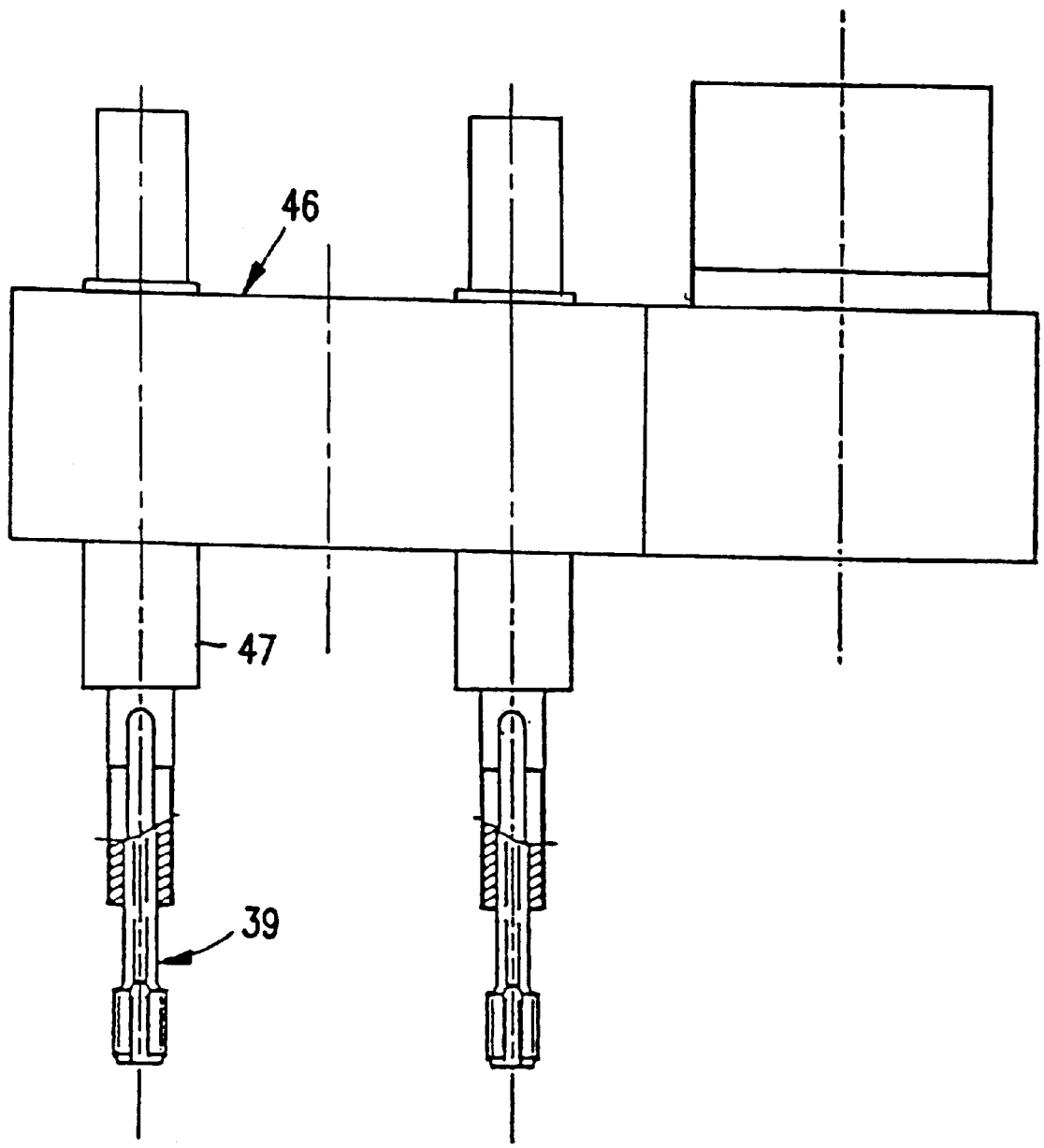

FIG. 8f shows a drilling device 46 which is provided with receiving units 47 into which the thread-cutting tools can be inserted. The drilling device 46 has an advancement control means which can be set in dependence on the pitch of the thread which is to be cut. It is possible for the automatic fitting machine to be used as the drilling device 46.

FIGS. 9a to 9d illustrate the connecting element 4 embodied as a union nut 48. To aid understanding, components which are the same as those in the previously described examples are provided with the same designations.

The union nut 48 has two threaded sections 5, 6, which are each designed as internal threads 60, 61 of the approximately cylindrical union nut. The threaded sections 5, 6 are oriented in the same direction and have different thread pitches. The second threaded section 6 of larger pitch also has a larger diameter. The outer casing of the union nut 48 is expediently provided with a wrench contour, with the result that the union nut can be tightened and released by a correspondingly shaped tool. A thread-free inner section 14 is provided between the two threaded sections 5, 6. The first and second threaded sections 5 and 6, respectively, each extend approximately over just half the length of the union nut and are separated by the short thread-free inner section.

The union nut 48 is provided for connecting two threaded members 49, 50 which are provided with threads which correspond to the threaded sections 5, 6 of the union nut. The threaded members 49, 50 are designed as a threaded pin and threaded stub, respectively, and form constituent parts of components 2, 3.

For the purpose of screw-connecting the threaded members 49, 50, according to FIG. 9b, the union nut 48 is first of all screwed onto the threaded member 49 in the direction of the arrow 51 by way of the first threaded section 5 of smaller diameter. It should be ensured here that the union nut is screwed on until such time as part of the first threaded section 5 is located in the region of the thread-free section of the threaded member 49. A stop 53 is expediently provided on the threaded member 49, said stop being arranged on the thread-free part of the threaded member 49 and marking the end position of the preliminary-fitting operation, which is shown in FIG. 9*b*. In this end position, the stop 53 of the threaded member 49 butts against the end side of the union nut 48.

For completing the finishing operation, according to FIGS. 9*c* and 9*d*, the union nut 48 is screwed onto the second threaded member 50 in the opposite direction 52, it being the case that the end side which adjoins the threaded section of the threaded member 49 tapers conically and can be introduced into a complementary, funnel-like recess in the second threaded member 50.

FIG. 9*c* illustrates the beginning of the fitting-completion operation, in which the conically tapering end side of the first threaded member 49 is at an axial distance l from the funnel-shaped recess of the second threaded member 50. The distance l advantageously corresponds to the difference between the thread pitches of the threaded sections 6 and 5 of the union nut 48 multiplied by the number of revolutions n which have to be executed by the union nut 48 in order to close up the distance l.

FIG. 9*d* shows the apparatus once fitting has been completed, in which case the threaded members 49, 50 are fixedly connected. The threaded members 49, 50 may be designed as lines and have an inner channel 54, 55. The conical design of the end side of the threaded member 49 and the complementary recess in the threaded member 50 ensure a sealed connection.

Figure 10B:
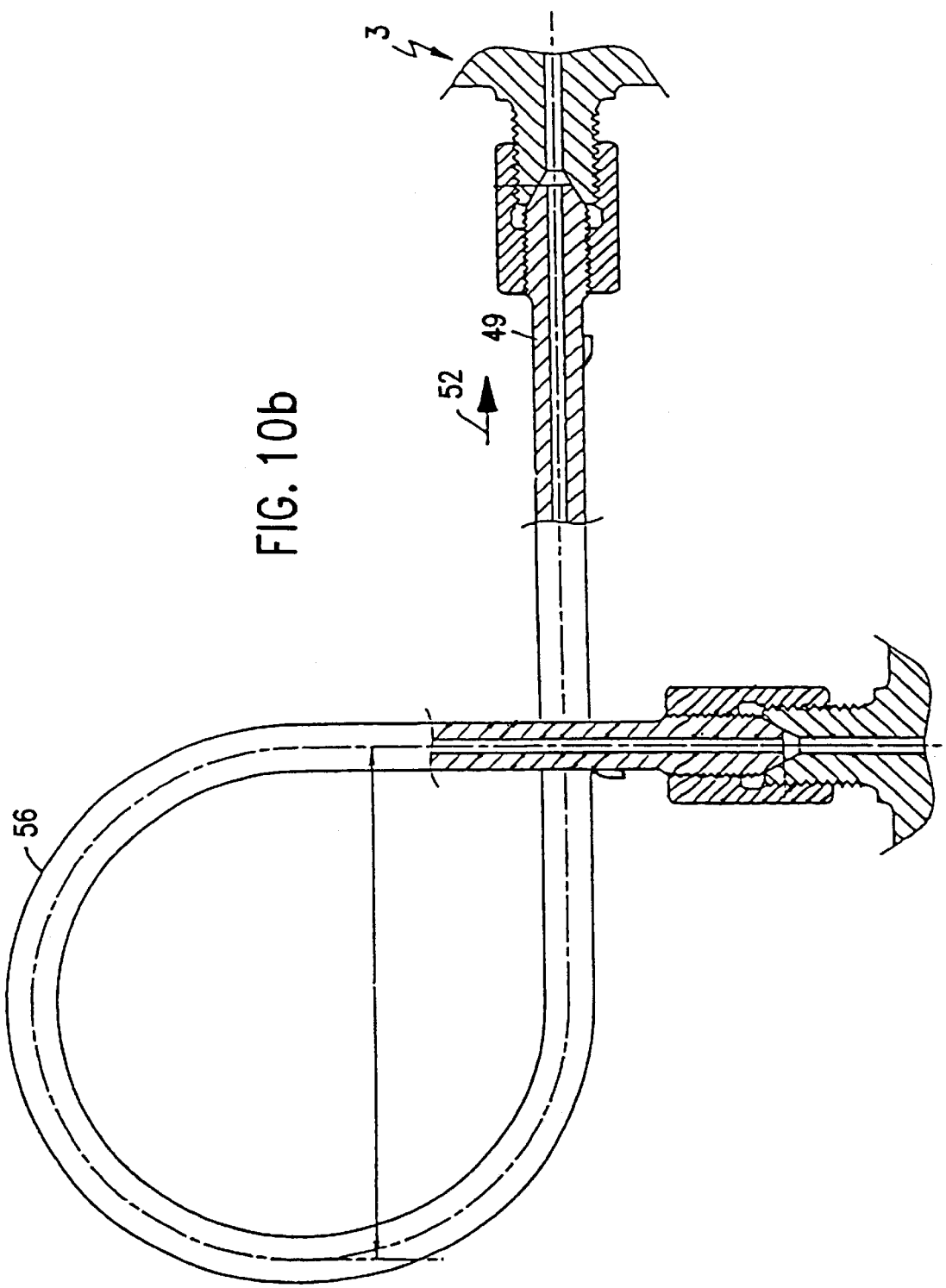

FIGS. 10*a* and 10*b* show the above described union-nut-specific process using the example of an injection line. The component 2 is designed as an injection line 56 which is provided with threaded members 49 on its respective axial end regions. The two threaded members 49 are intended to be screwed onto threaded stubs 50 of a component 3 with the aid of union nuts 48.

The injection line 56 describes an arc, with the result that the threaded members 49, which are arranged in the end region, cross at an angle, in particular at an angle of approximately 90°. At the beginning of the screw-connection operation, the axial end side of each threaded member 49 is at a distance l from the receiving funnel-shaped recess in the respective threaded stub 50. First of all just one threaded member 49 is positioned, with the union nut 48, on the threaded stub 50 in the direction of the arrow 52 and is just tightened slightly in order to secure the injection line 56 in captive fashion.

According to FIG. 10*b*, in the following step, the threaded member 49 at the opposite end of the injection line is pre-tightened with the result that the second end of the injection line 56 is also connected to the component 3. Thereupon, the two threaded nuts are definitively tightened, one after the other or simultaneously, until a predetermined angular position or a predetermined final torque value has been reached, this giving a liquid-tight and pressure-tight connection.

FIGS. 11*a* to 11*d* show the operation of screw-connecting two components using a different embodiment of a union nut 48. The union nut 48 has a first threaded section 5 of small pitch, which extends, on the inside of the union nut, approximately over half the length of the union nut. The second threaded section 6 is arranged on the outside 57 of the union nut, with a larger diameter; the threaded section 6 has a larger pitch than the first threaded section 5, which is designed as an internal thread 60, and it is designed to be slightly longer than half the length of the union nut 48. The two threaded sections extend to the same end side 59 of the union nut. The second threaded section 6, which is designed as an external thread 62, is adjoined by a nut head 58, the diameter of which is advantageously larger than the diameter of the external thread 62. The nut head 58 expediently has a contour which permits easy attachment of a fitting tool and, in addition, indicates the angular position of the union nut at any one time. A short thread-free section is provided on the outside 57, between the nut head 58 and the external thread 62.

The external thread 62 of the union nut has to be screwed into the threaded member 50, which has a threaded bore. The internal thread 60 of the union nut is screw-connected to the threaded member 49.

The process for screw-connecting the components corresponds essentially to that from FIG. 9. According to FIG. 11*b*, for preliminary fitting, the union nut 48 is first of all screwed onto the threaded member 49 in the direction of the arrow 51, the stop 53 of the threaded member 49 projecting into the thread-free inner section 14 of the union nut 48 and striking against an end side of the internal thread. For completing the fitting operation, according to FIGS. 11*c* and 11*d*, the union nut 48 and the threaded member 49 are displaced in the direction of the arrow 52 until the external thread 62 of the union nut 48 begins to engage in the thread of the threaded bore of the second threaded member 50. Thereupon, according to FIG. 11*d*, the union nut 48 is screwed into the threaded bore of the second threaded member 50 until the tapering end side of the first threaded member comes into contact with a complementary recess of the second threaded member. During the operation of screwing the union nut into the second threaded member 50, the first threaded member 49 covers the axial adjustment path l.

Figure 12A:
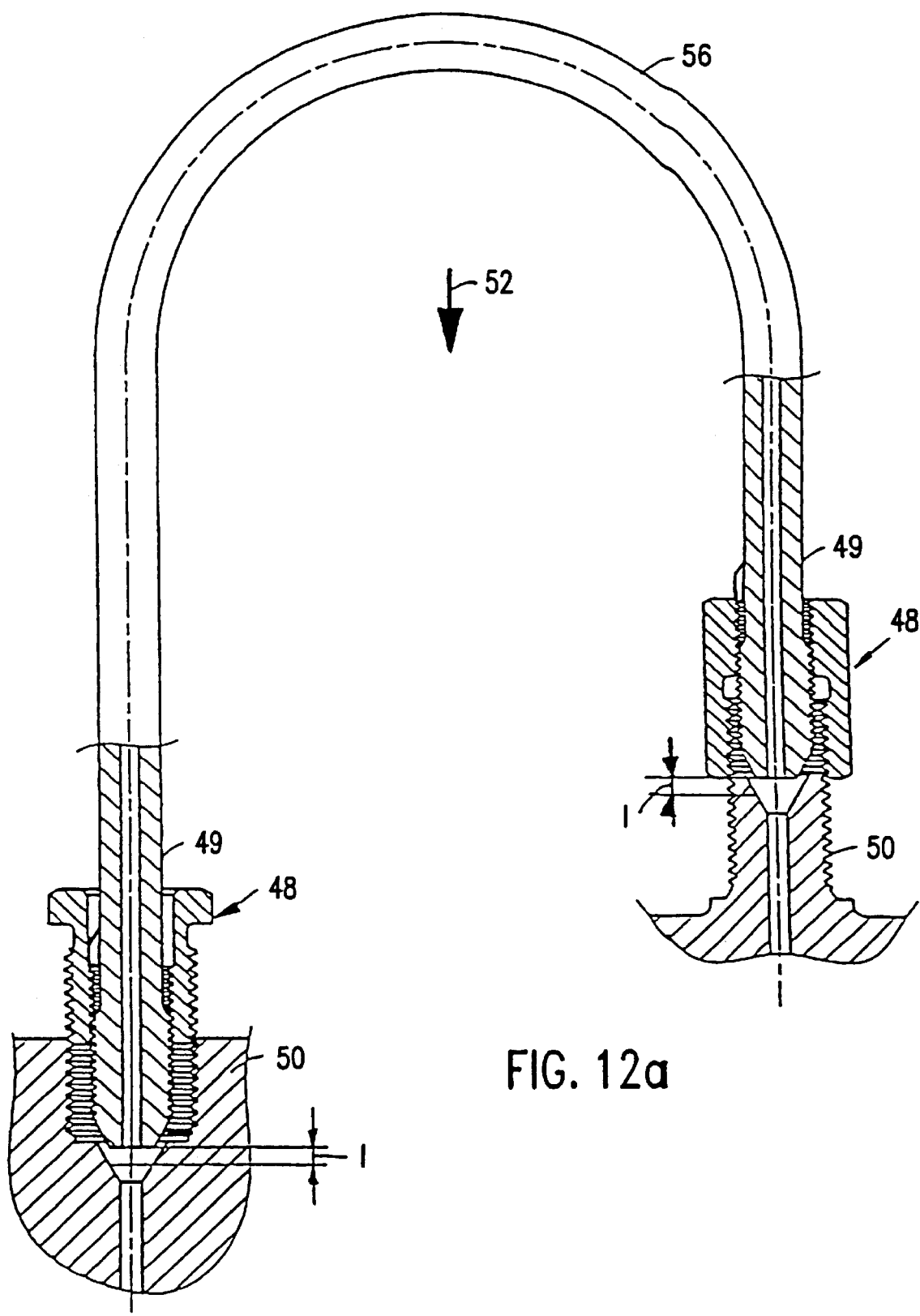
FIGS. 12a–12b show the process according to FIG. 11 using the example of an injection line.
Figure 12B:
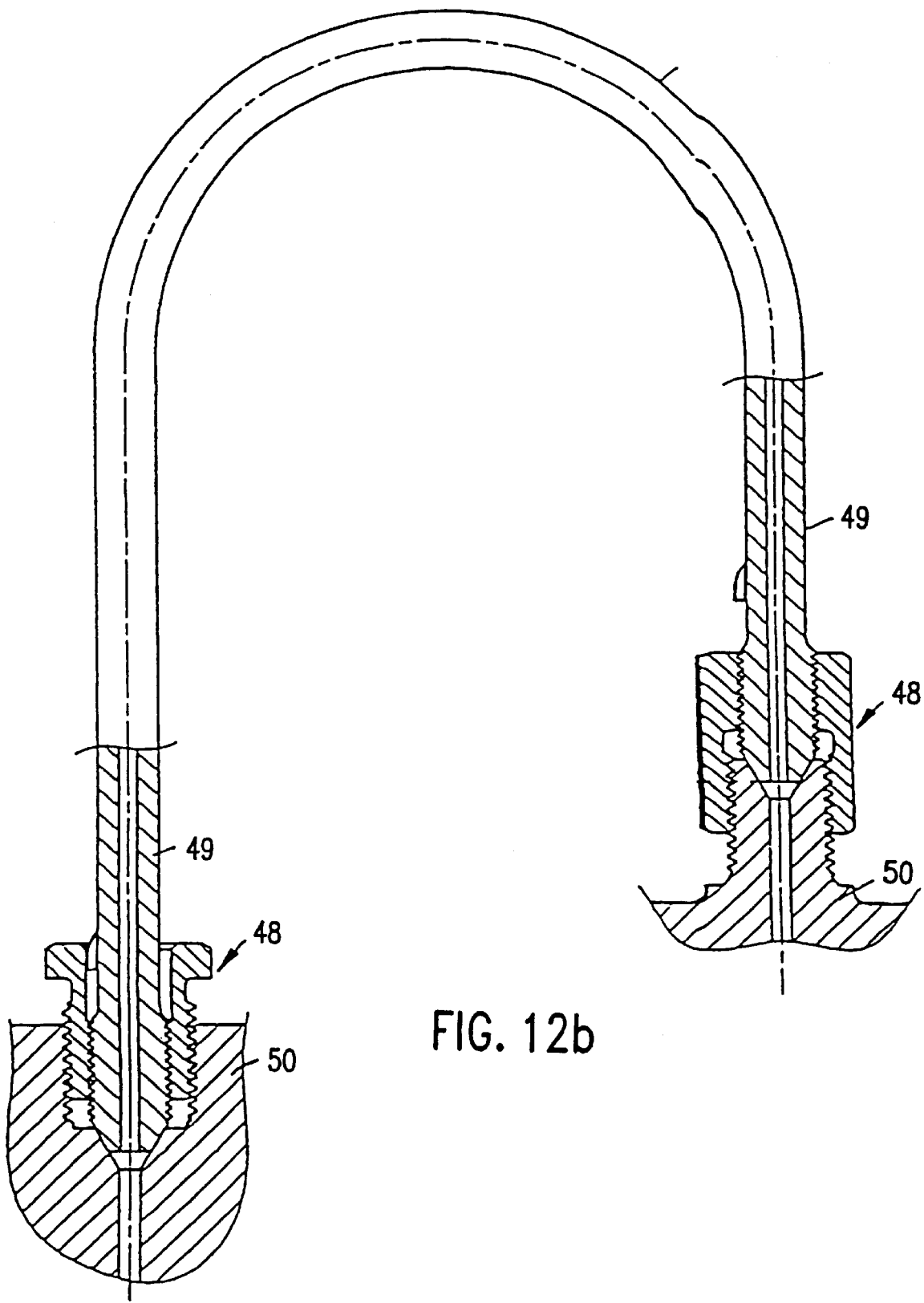

FIGS. 12*a* and 12*b* show an embodiment using the example of an injection line. The injection line 56 is of approximately U-shaped design and has in each case one threaded member 49 on the two axial end regions. A union nut 48 has been pre-fitted on each threaded member 49, it being the case that, in the left-hand half of FIGS. 12*a* and 12*b*, the union nut 48 is provided with an internal thread and an external thread and, according to the right-hand half of the figures, the union nut has two internal threads. Both union nuts are tightened in the direction of the arrow 52, the union nuts first of all being attached to the thread of the second threaded member 50. The conically tapering end side of each threaded member 49 is at an axial distance l from the funnel-shaped recess in the second threaded member 50.

According to FIG. 12*b*, the union nuts are definitively tightened, this giving a sealed connection between the threaded members 49, 50 and allowing liquid to be directed through the liquid channel of the injection line 56 without any losses.

If a plurality of union nuts are used, it is possible to provide different thread pitches for the individual threaded sections; this means that it is possible to vary the distance l between the individual threaded members at the beginning of the tightening operation or to influence the number of revolutions which are required in order to close up the distance l.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Process for automatically screw-connecting first and second components by a torque-controlled tightening method with an automatic fitting machine and at least one connecting element which screw-connects the components, wherein each of said at least one connecting element has two same-direction threaded sections of different pitches and each threaded section is screw-connected to one component in each case, with the following process steps for completing the fitting operation:

rotary-angle-controlled preliminary tightening of each of said at least one connecting element, termination of the rotary-angle-controlled preliminary tightening at the end of a predetermined rotational angle which substantially corresponds to contact between mutually facing surfaces of the components which are to be connected, and torque-controlled definitive tightening until a predetermined final torque value has been reached.

2. Process according to claim 1, wherein at least two connecting elements are provided which are tightened at the same time, longitudinal axes of the connecting elements being aligned parallel to one another.

3. Process according to claim 2, wherein the two threaded sections of each connecting element have different diameters, and wherein preliminary fitting and fitting completion take place in the same fitting direction.

4. Process according to claim 2, wherein each connecting element is first screw-connected for pre-fitting to the thread of the first component and then, for completing the fitting operation, is screw-connected in the opposite direction to the thread of the second component.

5. Process according to claim 2, wherein each connecting element is screw-connected during pre-fitting until it reaches a stop on the first component.

6. Process according to claim 2, wherein each connecting element used is a stud which is screwed into corresponding threaded bores in the two components.

7. Process according to claim 2, wherein each connecting element used is a union nut which is screwed-connected to two threaded members of the two components.

8. Process according to one of claim 1, wherein each connecting element is first pre-fitted on the first component and then, for completing the fitting operation, is brought, together with the first component, into alignment with the thread of the second component.

9. Process according to claim 8, wherein the two threaded sections of each connecting element have different diameters, and wherein preliminary fitting and fitting completion take place in the same fitting direction.

10. Process according to claim 8, wherein each connecting element is first screw-connected for pre-fitting to the thread of the first component and then, for completing the fitting operation, is screw-connected in the opposite direction to the thread of the second component.

11. Process according to claim 8, wherein each connecting element is screw-connected during pre-fitting until it reaches a stop on the first component.

12. Process according to claim 8, wherein each connecting element used is a stud which is screwed into corresponding threaded bores in the two components.

13. Process according to claim 8, wherein each connecting element used is a union nut which is screwed-connected to two threaded members of the two components.

14. Process according to claim 1, wherein the two threaded sections of each connecting element have different diameters, and wherein preliminary fitting and fitting completion take place in the same fitting direction.

15. Process according to claim 14, wherein each connecting element is first screw-connected for pre-fitting to the thread of the first component and then, for completing the fitting operation, is screw-connected in the opposite direction to the thread of the second component.

16. Process according to claim 14, wherein each connecting element used is a stud which is screwed into corresponding threaded bores in the two components.

17. Process according to claim 14, wherein each connecting element used is a union nut which is screwed-connected to two threaded members of the two components.

18. Process according to claim 1, wherein each connecting element is first screw-connected for pre-fitting to the thread of the first component and then, for completing the fitting operation, is screw-connected in the opposite direction to the thread of the second component.

19. Process according to claim 18, wherein each connecting element used is a stud which is screwed into corresponding threaded bores in the two components.

20. Process according to claim 18, wherein each connecting element used is a union nut which is screwed-connected to two threaded members of the two components.

21. Process according to claim 1, wherein each connecting element is screw-connected during pre-fitting until it reaches a stop on the first component.

22. Process according to claim 1, wherein each connecting element used is a stud which is screwed into corresponding threaded bores in the two components.

23. Process according to claim 1, wherein the connecting element used is a union nut which is screwed-connected to two threaded members of the two components.

24. Process according to claim 1, wherein one of said first and second components is a cylinder head and the other of said first and second components is a crank housing.

25. Process according to claim 1, wherein one of said first and second components is a crank shaft-bearing cap and the other of said first and second components is a crank housing.

26. Process according to claim 1, wherein one of said first and second components is a bearing cap and the other of said first and second components is a connecting rod.

27. Process according to claim 1, wherein one of said first and second components is a counterweight and the other of said first and second components is a crankshaft.

28. Process according to claim 1, wherein one of said first and second components is a flywheel and the other of said first and second components is a crankshaft.

29. Process according to claim 1, wherein one of said first and second components is a crankshaft and the other of said first and second components is a balancing weight.

* * * * *